US009081980B2

(12) United States Patent
Sambamurthy et al.

(10) Patent No.: US 9,081,980 B2
(45) Date of Patent: Jul. 14, 2015

(54) METHODS AND SYSTEMS FOR ENTERPRISE DATA USE MONITORING AND AUDITING USER-DATA INTERACTIONS

(71) Applicants: Namakkal S. Sambamurthy, Saratoga, CA (US); Parthasarathy Krishnan, Cupertino, CA (US)

(72) Inventors: Namakkal S. Sambamurthy, Saratoga, CA (US); Parthasarathy Krishnan, Cupertino, CA (US)

(73) Assignee: NSS Lab Works LLC, Saratoga, CA (US)

( * ) Notice: Subject to any disclaimer, the term of this patent is extended or adjusted under 35 U.S.C. 154(b) by 0 days.

(21) Appl. No.: 13/830,601

(22) Filed: Mar. 14, 2013

(65) Prior Publication Data
US 2013/0219463 A1 Aug. 22, 2013

Related U.S. Application Data

(63) Continuation of application No. 13/444,840, filed on Apr. 11, 2012.

(60) Provisional application No. 61/474,255, filed on Apr. 11, 2011.

(51) Int. Cl.
*G06F 21/31* (2013.01)
*G06F 21/62* (2013.01)
(Continued)

(52) U.S. Cl.
CPC ............ *G06F 21/6209* (2013.01); *G06F 21/31* (2013.01); *G06F 21/32* (2013.01); *G06F 21/554* (2013.01); *G06F 21/60* (2013.01); *G06F 21/84* (2013.01); *G06F 2221/2153* (2013.01)

(58) Field of Classification Search
USPC .............. 726/1, 2, 21, 36; 713/150, 163, 181; 380/255, 264, 276
See application file for complete search history.

(56) References Cited

U.S. PATENT DOCUMENTS

| | | | |
|---|---|---|---|
| 5,229,764 A | 7/1993 | Matchett et al. | |
| 5,915,973 A | 6/1999 | Hoehn-Saric et al. | |

(Continued)

FOREIGN PATENT DOCUMENTS

| | | |
|---|---|---|
| JP | 2001313006 | 9/2001 |
| WO | WO 2007/062121 | 5/2007 |

OTHER PUBLICATIONS

Spectorsoft "Investigate Employees You Suspect of PC and Internet Abuse", http://www.spectorcne.com, Aug. 16, 2010, pp. 1-4.

(Continued)

*Primary Examiner* — Jason K. Gee
*Assistant Examiner* — Sharif E Ullah
(74) *Attorney, Agent, or Firm* — Martine Penilla Group, LLP

(57) ABSTRACT

A method for managing data use of an enterprise is disclosed. The method includes receiving login parameters from a user associated with user identification information. The method authenticates the login parameters and the user information to determine if the login parameters match the user identification information. The method provides access to specific data in a database that stores enterprise information. Upon providing access, initiating video capture of a viewing space for the screen, the viewing space being configured to include a location where the user associate with the user identification information is predefined to reside when accessing the specific data. During the video capture, capturing image data presented on the screen and input received for the user interface of the screen. The method acts to bind the video capture and the captured image data presented on the screen and the input received.

16 Claims, 21 Drawing Sheets

(51) Int. Cl.
*G06F 21/55* (2013.01)
*G06F 21/84* (2013.01)
*G06F 21/60* (2013.01)
*G06F 21/32* (2013.01)

(56) References Cited

U.S. PATENT DOCUMENTS

| | | | |
|---|---|---|---|
| 6,111,517 A * | 8/2000 | Atick et al. | 340/5.83 |
| 7,039,221 B1 | 5/2006 | Tumey et al. | |
| 7,460,149 B1 | 12/2008 | Donovan et al. | |
| 7,940,929 B1 | 5/2011 | Sengupta | |
| 8,024,779 B2 | 9/2011 | John et al. | |
| 8,219,021 B2 | 7/2012 | Rogers et al. | |
| 8,261,090 B1 | 9/2012 | Matsuoka | |
| 8,272,053 B2 | 9/2012 | Markham et al. | |
| 8,484,355 B1 * | 7/2013 | Lochhead et al. | 709/226 |
| 2002/0083342 A1 | 6/2002 | Webb et al. | |
| 2002/0095507 A1 | 7/2002 | Jerdonek | |
| 2002/0172931 A1 | 11/2002 | Greene et al. | |
| 2003/0051161 A1 | 3/2003 | Smith et al. | |
| 2004/0010720 A1 | 1/2004 | Singh et al. | |
| 2004/0078569 A1 * | 4/2004 | Hotti | 713/165 |
| 2005/0057339 A1 | 3/2005 | Ikehara et al. | |
| 2006/0242254 A1 | 10/2006 | Okazaki et al. | |
| 2006/0288234 A1 | 12/2006 | Azar et al. | |
| 2007/0048723 A1 | 3/2007 | Brewer et al. | |
| 2007/0112775 A1 * | 5/2007 | Ackerman | 707/9 |
| 2007/0186106 A1 | 8/2007 | Ting et al. | |
| 2007/0277061 A1 | 11/2007 | Ashe | |
| 2007/0300179 A1 | 12/2007 | Friedlander | |
| 2008/0102435 A1 | 5/2008 | Rogers et al. | |
| 2009/0080716 A1 | 3/2009 | Yanagi | |
| 2009/0185723 A1 | 7/2009 | Kurtz et al. | |
| 2009/0313495 A1 | 12/2009 | Krishnan et al. | |
| 2010/0111363 A1 | 5/2010 | Kelly et al. | |
| 2010/0205667 A1 | 8/2010 | Anderson et al. | |
| 2010/0263035 A1 | 10/2010 | Tock et al. | |
| 2010/0295944 A1 | 11/2010 | Takeuchi et al. | |
| 2010/0323608 A1 | 12/2010 | Sanhedrai et al. | |
| 2011/0087766 A1 | 4/2011 | Kuo et al. | |
| 2011/0128384 A1 | 6/2011 | Tiscareno et al. | |
| 2011/0177484 A1 | 7/2011 | Morgan et al. | |
| 2011/0223576 A1 | 9/2011 | Foster et al. | |
| 2011/0244440 A1 | 10/2011 | Saxon et al. | |
| 2012/0034584 A1 | 2/2012 | Logan et al. | |
| 2012/0042358 A1 | 2/2012 | Kondur et al. | |
| 2012/0077176 A1 | 3/2012 | Foster et al. | |
| 2012/0077177 A1 | 3/2012 | Foster et al. | |
| 2012/0098793 A1 | 4/2012 | Cheng | |
| 2012/0124559 A1 | 5/2012 | Kondur | |
| 2013/0096916 A1 | 4/2013 | Pemmaraju | |

OTHER PUBLICATIONS

IMonitor EAM "Computer and Internet Monitoring Software, Keylogger, Spy Software for Employee Monitoring & Employee Time Tracking", http://www.imonitorsoft.com, Aug. 16, 2010, pp. 1-2.

Observe It Monitoring TS, Citrix, Vmware and SSH sessions, http://www.observeit-sys.conn/Products/How_It_Works, Sep. 4, 2011, pp. 1-2.

Klosterman et al. "Secure Continuous Biometric-Enhanced Authentication", School of Computer Science, Carnegie Mellon University, Pittsburgh, PA 15213, May 2000, pp. 1-27.

* cited by examiner

Ubiquitous Digital Cameras Facilitate Piracy

Information can now copied & moved in the blink of an eye!

Credit card, Healthcare data. Company IP, Financial data, CAD/CAM data, Creative designs, Government, Military data....... Any information that has value!

Policy Display -- [100086A] Group -- [State Alumni Association]

| Policy | Status | Issued | Mode | Mode Prem | Bill Day | Group | Paid To | Billed To | Last Change |
|---|---|---|---|---|---|---|---|---|---|
| 100086A | Active | 07/17/01 | 6 | 2,187 | 17 | 2000 | 06/17 | 06/17 | 04/27 |

Insured/Owner Information

Coverage Information

Cash Value    Policy Loan

Coverage  Name  Agent  Memo  User D
Number  Alpha  Print  Top

Medical Records

Account NO: 1001.0
Name: SMITH, Anthony
Address1: B37 E. Main ST.
Address2:
Name: BOARDMAN, OH 44512
Phone: (333) (758-3345)
SS#: 539780952
Chart no: MI010
DOB: 03/21/1933
Provider: 1- KUMAR, AJIT W
Responsible Party: JONATHAN R. SMITH
RP Phone#: (333) (533-0956)
Chronic Diagnosis: 402900 26690
History
Date: 04/03/2001
Tony passed out at home today. Sight

Fig. 1

Policy Rules

| | Auth Users | Screen Capture | User Photo | Audio | Disable Web | Allow multiuser | Detect Photo taken | Alert on photo taken | |
|---|---|---|---|---|---|---|---|---|---|
| Disp 1 | A, B | 30 sec | When changed | N | Y | N | Y | Y | |
| Disp 2 | Any | 1 min | When changed | Y | Y | Y | Y | Y | |
| Disp 3 | Managers | 10 sec | On change + every hour | N | N | N | Y | Y | |
| ... | | | | | | | | | |

Fig. 18

METHODS AND SYSTEMS FOR ENTERPRISE DATA USE MONITORING AND AUDITING USER-DATA INTERACTIONS

CLAIM OF PRIORITY

This application is a continuation application of U.S. patent application Ser. No. 13/444,840, entitled "Secure Display System for Prevention of Information Copying from a Display Screen System", which claims priority from U.S. Provisional Patent Application No. 61/474,255, filed Apr. 11, 2011, and entitled "Secure Display System for Prevention of Information Copying from any Display Screen System." Each above-identified application is herein incorporated by reference.

BACKGROUND

1. Field of the Invention

The present embodiments relate to devices, methods, systems, and computer programs for improving security, and more particularly to devices, methods, systems, and computer programs for improving security embedded in a presentation display.

2. Description of the Related Art

Rapid evolution of technology and mass adoption of cheap devices, such as tablets and electronic readers with high definition displays, digital cameras, 3D printers, 3D scanners, high capacity flash storage cards with embedded WiFi, wide spread availability of Internet services, etc., have introduced challenges to businesses and individuals to protect, preserve, and enhance their intellectual property and intellectual assets.

It is in this context that embodiments arise.

SUMMARY

Devices, methods, computer programs, and are presented for displaying information output of a host computer. It should be appreciated that the present embodiments can be implemented in numerous ways, such as a method, an apparatus, a system, a device, or a computer program on a computer readable medium. Several embodiments are described below.

In one embodiment, a method for managing data use of an enterprise is disclosed. The method includes receiving login parameters from a user associated with user identification information, where the login parameters are supplied through a user interface of a screen. The method authenticates the login parameters and the user information to determine if the login parameters match the user identification information. The method provides access to specific data in a database that stores enterprise information. The specific data is managed by policy rules that determine if the specific data is shared by users of the enterprise or is private to the user. Upon providing access, initiating video capture of a viewing space for the screen, the viewing space being configured to include a location where the user associate with the user identification information is predefined to reside when accessing the specific data. During the video capture, capturing image data presented on the screen and input received for the user interface of the screen. The method acts to bind the video capture and the captured image data presented on the screen and the input received. The binding acting to define audit data that defines a link between the user and actions taken by the user regarding the specific data, wherein the method is executed by a processor.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIG. 1 illustrates the problem of piracy of information on a display.

FIG. 18 is an exemplary table of policy rules, according to one embodiment.

DETAILED DESCRIPTION

Figure 2:
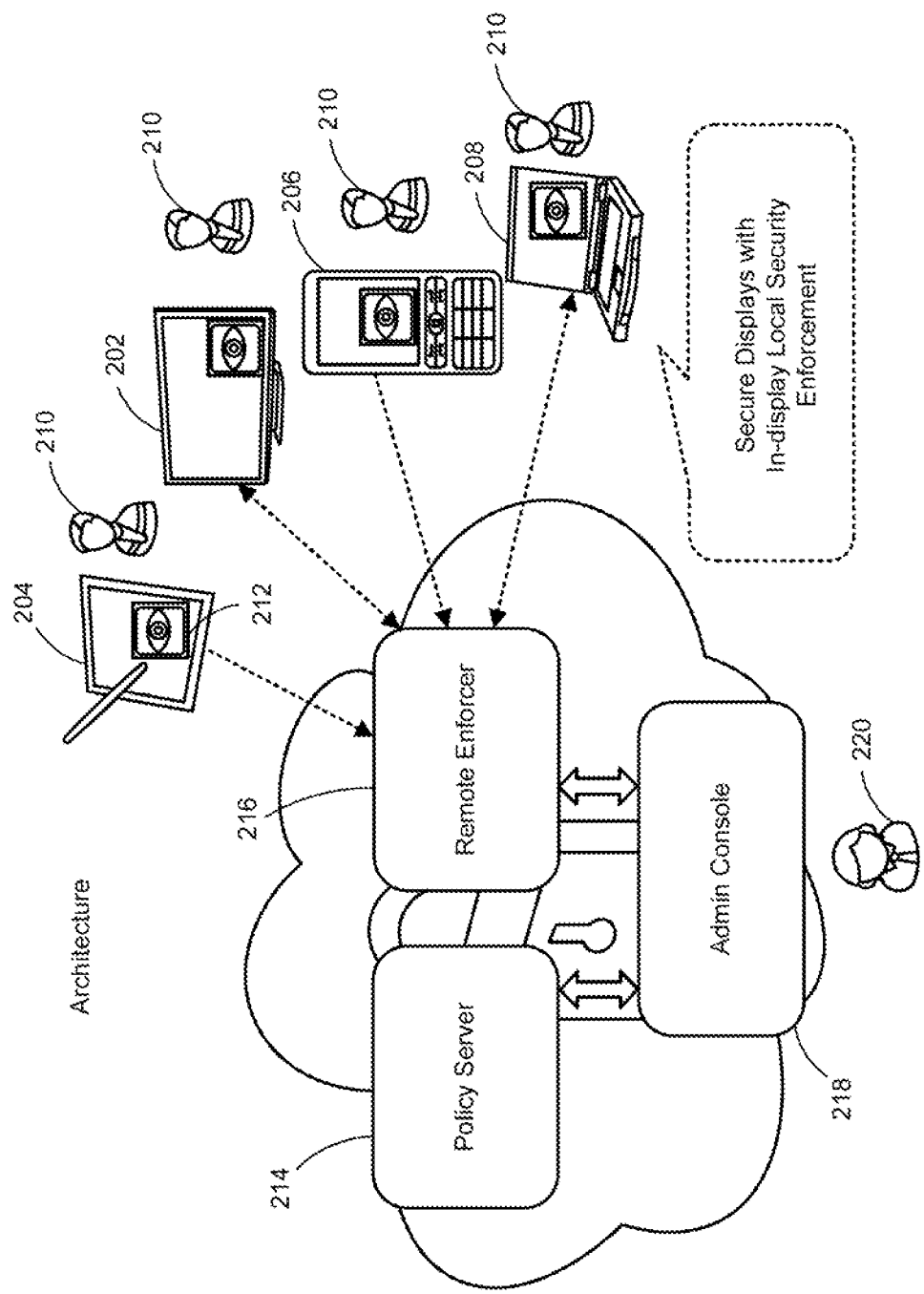
FIG. 2 illustrates a simplified architecture for implementing embodiments described herein.

The following embodiments describe devices, methods, systems and computer programs for improving security. In one embodiment, a monitor is embedded with security circuitry to implement security on the monitor in order to protect the information presented at the monitor.

It will be apparent, that the present embodiments may be practiced without some or all of these specific details. In other instances, well known process operations have not been described in detail in order not to unnecessarily obscure the present embodiments.

FIG. 1 illustrates the problem of piracy of information on a display. In the digital world, new generation digital displays have reached resolutions in excess of 300 pixels per square inch to match or exceed physical hard copy print, such as a copy printed on a laser printer at 150 dot per square inch. Digital cameras now have 10 Megapixels sensors and many "smart" phones have 5 megapixel digital cameras or more. Thanks to the "high resolution" of current displays, the image quality is very close to "print media" and hence poses the same information security issues and potential for data theft. In other words, just like "print", security management and control is complex once information is committed to print. Data can be easily stolen by making copies or using a scanner to make a digitized electronic copy of the printed content. The same is now true for "displays". Any content shown on the display is now subject to the same print media security management control issues.

Digital Cameras are now being embedded into eyewear glasses, ID cards, pens, key chains, barcode scanners, and many are capable of shooting HD quality pictures at 30 frames per second or more. Taking 'copies' of IPR assets, creative designs, PII (Personally Identifiable Information), PHI (Personal Health Information) is now a major business issue worldwide for businesses, governments, and individuals. Stolen information can be transmitted anywhere bypassing existing security measures employed today, such as multi factor biometric access control, firewalls, intrusion detection systems, Data Leak Prevention (DLP) systems, Physical Access Control 15 Systems (PACS), etc.

Digital Data can be vulnerable to a breach in any of the commonly recognized 4 data states:

1. "data in motion" (i.e., data that is moving through a network, including wireless transmission)

2. "data at rest" (i.e., data that resides in databases, file systems, and other structured storage methods)

3. "data in use" (i.e., data in the process of being created, retrieved, updated, or deleted)

4. "data disposed" (e.g., discarded paper records or recycled electronic media)

Sensitive data in each of these data states (with the possible exception of "data in use") may be secured using methods that render sensitive data unusable, unreadable, or indecipherable to unauthorized individuals, such as encryption and destruction.

The exception case of "data in use" is a major issue because the data may be "leaked" via different channels: a digital image taken with a digital camera, "copy/cut/paste" of email contents, a file copy, a "print screen" to an electronic file, etc.

While several solutions have attempted to solve the Digital copying problem, the solutions have failed to address the Human factor component to act as a deterrent. (References: JP2001313006 ANTI-PHOTOGRAPH-STEALING DEVICE BY INFRA-RED LIGHT; REMOTE CONTROL SYSTEM AND ACCESS CONTROL METHOD FOR INFORMATION INPUT APPARATUS US20060242254, SYSTEMS AND METHODS FOR RECEIVING INFRA-RED DATA WITH A CAMERA DESIGNED TO DETECT IMAGES BASED ON VISIBLE LIGHT US20110128384A1, US20040202382 Image capture method, device and system, US20100323608A1 System and method for preventing photography, Systems and methods for disabling recording features of cameras US20070103552).

These solutions do not address the data in use leak channel via computer display, also called the "last inch/millimeter" interface from the display to the user security, a vulnerability that has been present ever since computers became prevalent.

FIG. 2 illustrates a simplified architecture for implementing embodiments described herein. To provide security at the presentation level, circuitry 212 or computer programs are embedded in a presentation device to provide security while users 210 receive information in the presentation device. Embodiments presented herein are described with reference to a computer display 202, but the principles presented may be applied to any computing device that provides presentation of information, such as tablets 204, mobile phones 206, smart phones, laptops 208, personal computers with integrated display, book readers, televisions, portable gaming devices, music players, etc.

In addition, some embodiments provide circuitry that is embedded inside a computing device (e.g., a display). In other embodiments, the security solution may be distributed across two or more different devices. For example, a separate computing device may be installed between a display and a personal computer, where the computing device is also attached to a camera that monitors the user in front of the display.

The secure displays provide in-display security enforcement, and the displays are in communication with one or more remote security servers. In one embodiment the security servers include a policy server 214, a remote policy enforcer 216, and an administrator console 218. The policy server 214 enforces security policies configured by the administrator 220, and the remote enforcer 216 receives information from the remote secure displays and provides security commands that are transmitted to the secured displays. The administrator console 218 provides a Graphical User Interface (GUI) for configuring the security policies implemented by the system, including the creation, modification, and deletion of users, security levels, security rules, logging requirements, etc.

Figure 3:
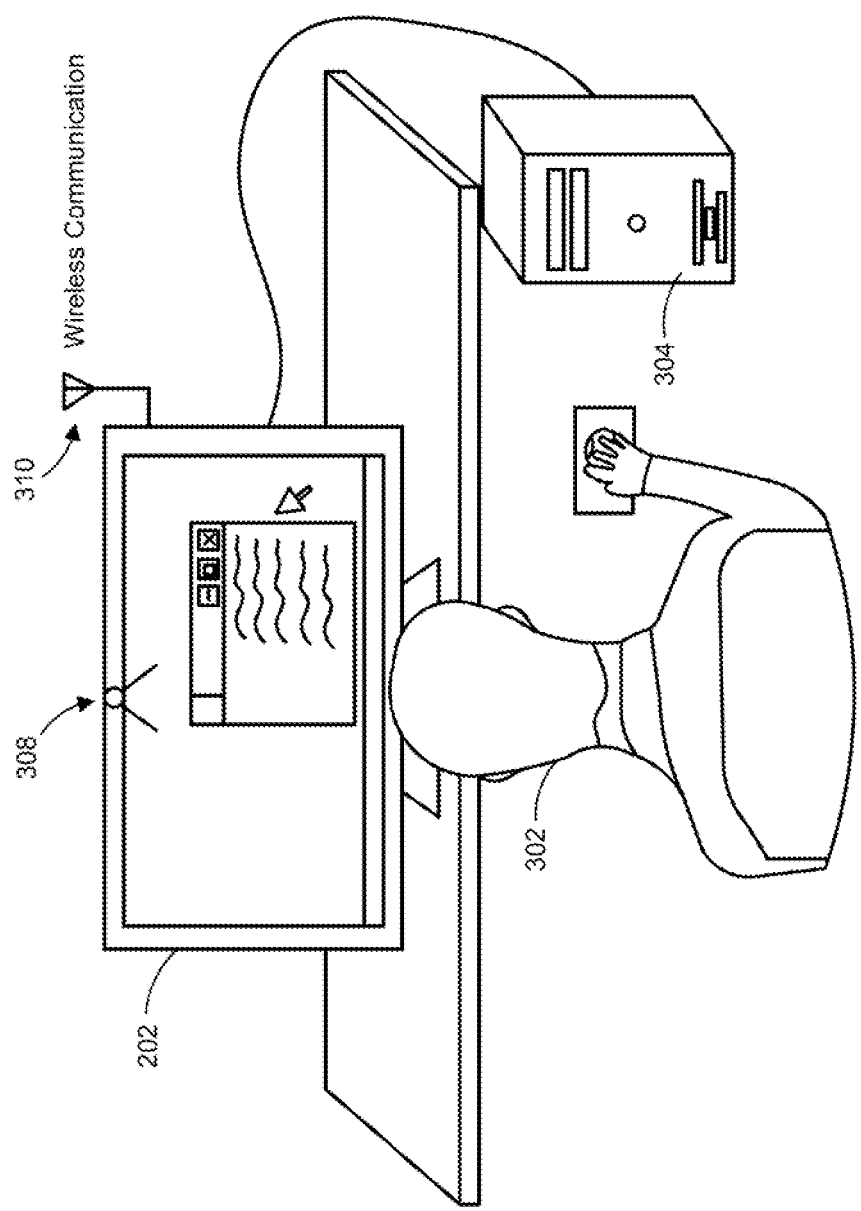
FIG. 3 illustrates a user utilizing a secure display, according to one embodiment.

FIG. 3 illustrates a user utilizing a secure display, according to one embodiment. Digital technology and security practices have created challenges in ensuring that the right person has the "privileges" for the digital and or physical services associated with the information or physical assets like a compute device such as desktop computer, laptop, tablet, smart phone, portable hard disk, flash memory card, printer or door to a secure site or a home. There are delegation challenges to manage architecture and management of an information system—the gate-keeper or super user delegate becomes the "master" regardless of what the access rules say. And if that delegate designs or administers the system to permit persons to post compartmented information, while at the same time giving access to users who are not in the compartment, then the super user will have destroyed the compartment security, possibly without anyone noticing. This is a critical problem in today's all digital world to manage and track who did what where when and also to secure an immutable audit trail of transactions.

In FIG. 3, user 302 is working on a personal computer 304 which is attached to a secure display 202. The secure display includes a camera 308 and a wireless communication module 310. The camera 308 takes images of the area in front of the display, and software inside the secure display 202 analyzes the image information to detect potential security breaches, such as an authorized user, multiple users viewing the display, a camera taking pictures of the information on the display, etc. In one embodiment, face recognition technology is utilized to determine the identity of the user operating the personal computer 304.

The wireless communication module 310 (e.g., a WiFi transceiver) provides an alternate channel of communication from the secure display to a remote security server, which is a different communications channel from the network connection utilized by the personal computer 304. This alternate communication channel provides a robust security solution that does not rely on the assets in the personal computer 304, such as a NIC card for connecting to the network.

Figure 4:
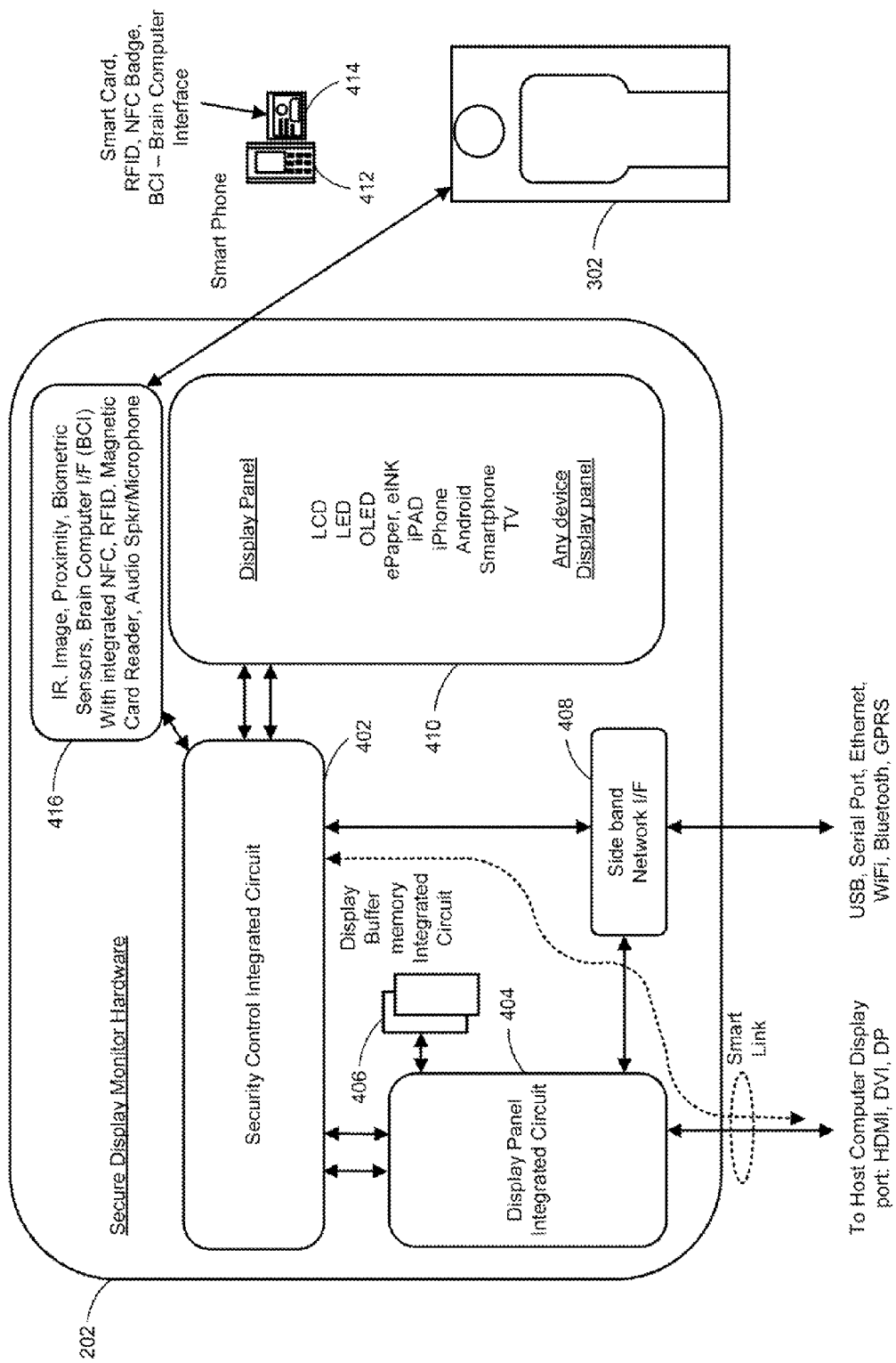
FIG. 4 illustrates an exemplary architecture of a secure display, according to one embodiment.

FIG. 4 illustrates an exemplary architecture of a secure display, according to one embodiment. Embodiments of the disclosure address the human factor involved in IPR management issues to provide a continuous authentication and monitoring system. Embodiments eliminate the "opportunity", nullify "rationalization" and create a negative ROI for "Incentive/Pressure" to encourage and build a "habit" of good citizen behavior.

Besides IPR protection management, the secure embodiments presented herein may be used for applications in work flow tracking and optimization, manufacturing, testing, quality assurance, payment systems, and DRM applications. Embodiments prevent the copying or misuse of information displayed on any monitor by employing continuous context-based smart activity processing technology. In one embodiment, every user in the range of visibility of the monitor is continuously monitored and authenticated.

In an exemplary embodiment, the secure display monitor 202 includes a security control integrated circuit (IC) that interfaces with other modules within the display 202. The display further includes a display panel (e.g., an LCD) IC 404 that drives the display panel 410, a display buffer memory 406 for storing pixel data to be displayed on the LCD 404, a side band network interface 408, and one or more sensors 416.

The security control integrated circuit 402 shares a link to the host computer with the display panel IC 404. This link provides the data to be displayed on the monitor and may utilize one or more different protocols such as HDMI, DVI, DP, etc. In addition, the security control IC 402 utilizes the side band network interface 408 to communicate with a remote security server without having to rely on networking resources from the host. The side band network interface 408 may utilize one or more communications protocols selected from a group consisting of USB, serial port, Ethernet, WiFi, Bluetooth, GPRS, any mobile communications protocol, etc.

The sensors 416 integrated in the display may include one or more of an infrared sensor, image sensor, proximity sensor, biometric sensor (e.g., fingerprint, eye recognition, etc.), Brain Computer Interface (BCI) with integrated NFC, RFID, magnetic card reader, microphone, speaker, etc. In one embodiment, the sensors 416 monitor communications near the monitor such as communications utilizing a mobile phone 412, or a smart card 414 being utilized by the user 302.

It is noted that the embodiments illustrated in FIG. 4 are exemplary. Other embodiments may utilize different sensors, additional modules, or combine the functionality of two or more modules into a single module. The embodiments illustrated in FIG. 4 should therefore not be interpreted to be exclusive or limiting, but rather exemplary or illustrative.

Figure 5:
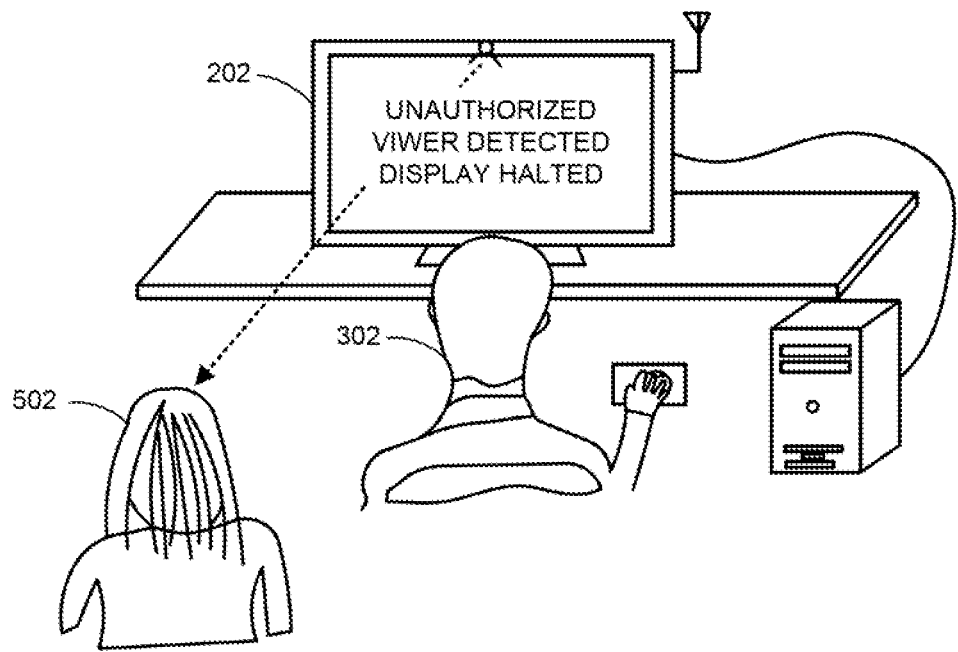
FIG. 5 illustrates the detection of an unauthorized user, according to one embodiment.

FIG. 5 illustrates the detection of an unauthorized user, according to one embodiment. FIG. 5 shows user 502 standing behind authorized user 302 which is with secure monitor 202. User 502 is not authorized to view information on display 202, and when the secure display 202 captures an image that includes user 502, the subsequent image analysis detects an unauthorized user and, according to the existing security policy, disables the display to avoid user 502 having access to the displayed information. In one embodiment, a message is presented on the display identifying that the display is being halted because an unauthorized user has been detected.

In another embodiment, user 502 is also authorized to operate with display 202. However, there is a security policy that only one user is able to access the display at any time, which causes the display being halted for having too many users accessing the display. This security policy may be useful when different users may access the same computing device, but the users may have different access levels when using the computing device. By disabling two users from accessing the display at the same time, the different security levels are enforced.

Figure 6:
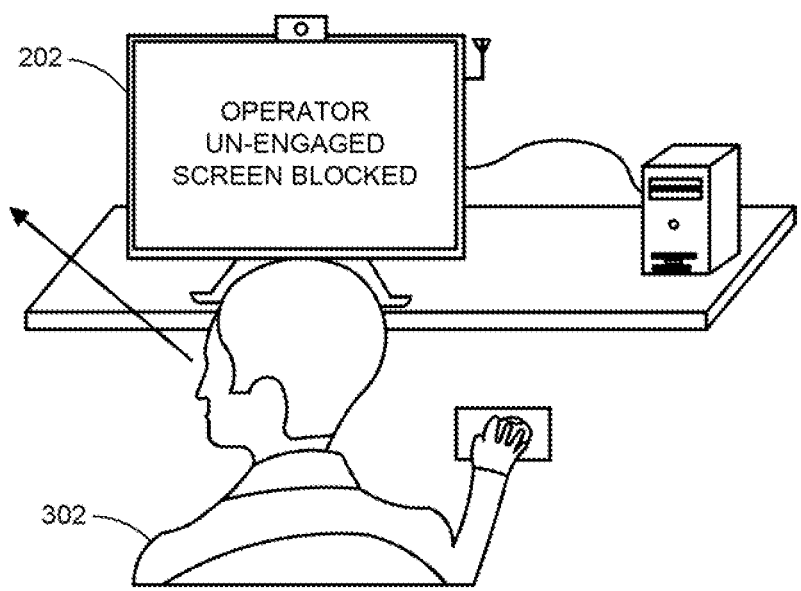
FIG. 6 illustrates the securing of the display while the user is not engaged with the display, according to one embodiment.

FIG. 6 illustrates the securing of the display while the user is not engaged with the display, according to one embodiment. When user 302 is not utilizing the display 202 (e.g., the user is looking away, or the user is reading a paper on his desk, or the user is away), the secure display blocks or disables the screen in order to avoid access by other users. In one embodiment, a predetermined amount of time is defined in the security policy before the display is blocked while the user is not engaged with the display.

Figure 7:
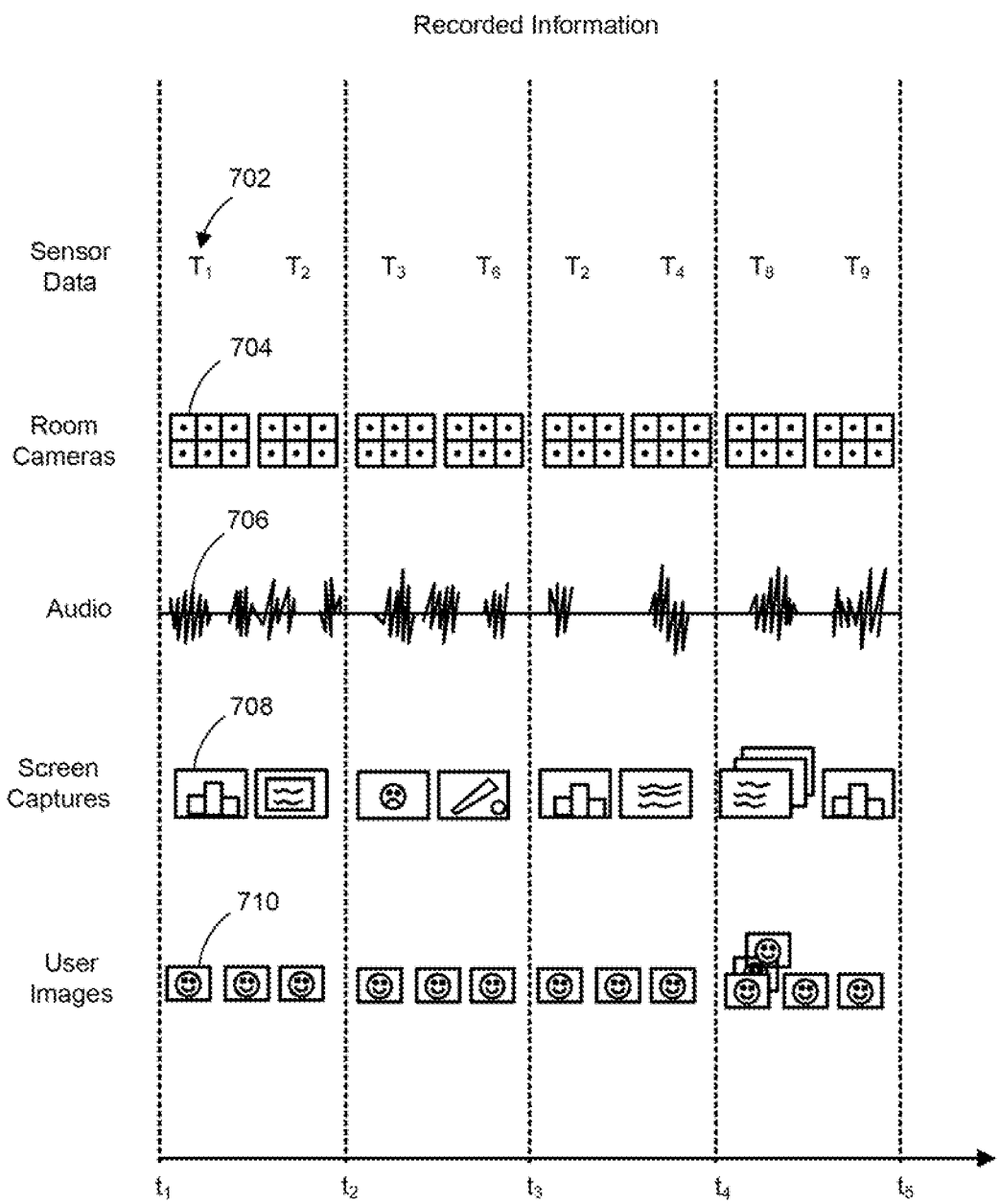
FIG. 7 illustrates the retrieval and storage of different types of information over time, according to one embodiment.

FIG. 7 illustrates the retrieval and storage of different types of information over time, according to one embodiment. Over time, the secure monitor collects information regarding the use of the display and regarding environmental parameters. The collected information is transmitted to a remote security server over the side band network interface 408 of FIG. 4, although other communication devices may also be utilized.

In one embodiment, the collected information include user images 710, screen captures 708, audio segments 706, images from area cameras 704, and sensor data 702. The user images are taken with the camera integrated in the display, or attached to the display, to provide information regarding the user or users situated in front of the display. Policy rules defined how often pictures of the user are taken or under what circumstances. In one embodiment, the images are taking every minute, although other intervals may also be configured. In addition, the user images may also be obtained when there are changes in front of the display (e.g., a new user enters the area) or when there is a large amount of data (e.g., beyond a threshold level of data per unit of time) being downloaded on the display. This guarantees that if a user is accessing a large amount of information, the user's image is captured.

The screen captures 708 provide, as its name implies, information regarding the appearance of the display at a given point in time. Similarly to the case of user images, screen captures may be obtained periodically or be triggered by security events. In one embodiment, the amount of data captured in the screen captures is reduced by eliminating some of the background information (e.g., Windows background photo) which is considered irrelevant for security purposes.

Audio segments 706 may also be obtained periodically or when triggered by a security event (e.g., voices detected near the secure display). Room cameras 704 provide images of an area where the display is situated (e.g. a room with a plurality of cubicles with workers in the cubicles). The sensor data 702 provides information collected by the sensors, such as temperature, humidity, air pressure, etc., and may be collected periodically or triggered under certain events.

It is noted that the embodiments illustrated in FIG. 7 are exemplary. Other embodiments may utilize different types of information. The embodiments illustrated in FIG. 7 should therefore not be interpreted to be exclusive or limiting, but rather exemplary or illustrative.

Figure 8:
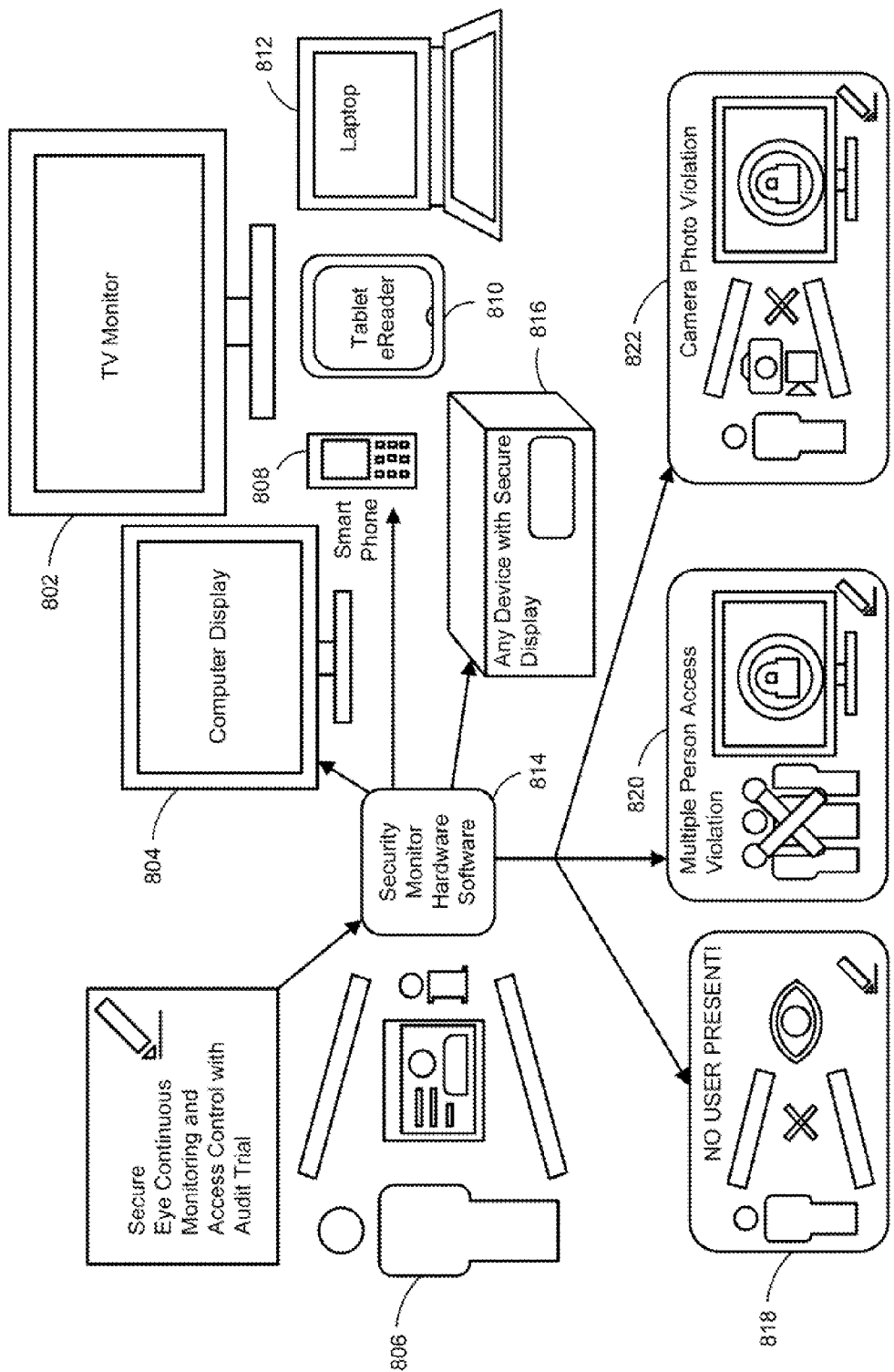
FIG. 8 illustrates a simplified architecture for implementing embodiments described herein.

FIG. 8 illustrates a simplified architecture for implementing embodiments described herein. One embodiment is similar to a "black box flight data recorder" in an airplane. The authentication system has the ability to identify the display component and the computer monitor as a trusted device. The trust is then integrated with the user who is in front of the display device, by physically identifying and authenticating the user. Various biometric sensors may be utilized for the user physical authentication, such as cameras for face recognition, IRIS recognition, fingerprint, temperature sensor, weight sensor, EEG signal via Brain computer Interface and DNA, etc. In one embodiment, sensor data is continuously transmitted and validated through a Side Channel Interface (SCI) that communicates with a centrally located authentication registry. In another embodiment, the sensor data is transmitted in predefined intervals or periods of time.

In one embodiment, the biometric identity of the user is tied with the centrally available authentication system that uses a username and password, or any other additional data, such as physical location information, time and date, etc. The authentication utilizes multiple pieces of information to establish a physical presence of the user, which is integrated with the trusted display and computer. The trusted (e.g., secured) display device is both first and last point of interface to the user and any protected information and services are protected and available for use by an authorized user.

In one embodiment, the user is continuously authenticated throughout the session, based on physical presence and using data signals from multiple sensors integrated with the Display such as cameras, microphones, speakers, IR detectors, thermometers, proximity sensors. In one embodiment, additional inputs from other external sensors are utilized, such as pressure sensors, weight sensors, surveillance cameras in close proximity to the secured monitor in front of the user, IP addresses, MAC addresses, physical location data, etc., to improve system accuracy.

Figure 9:
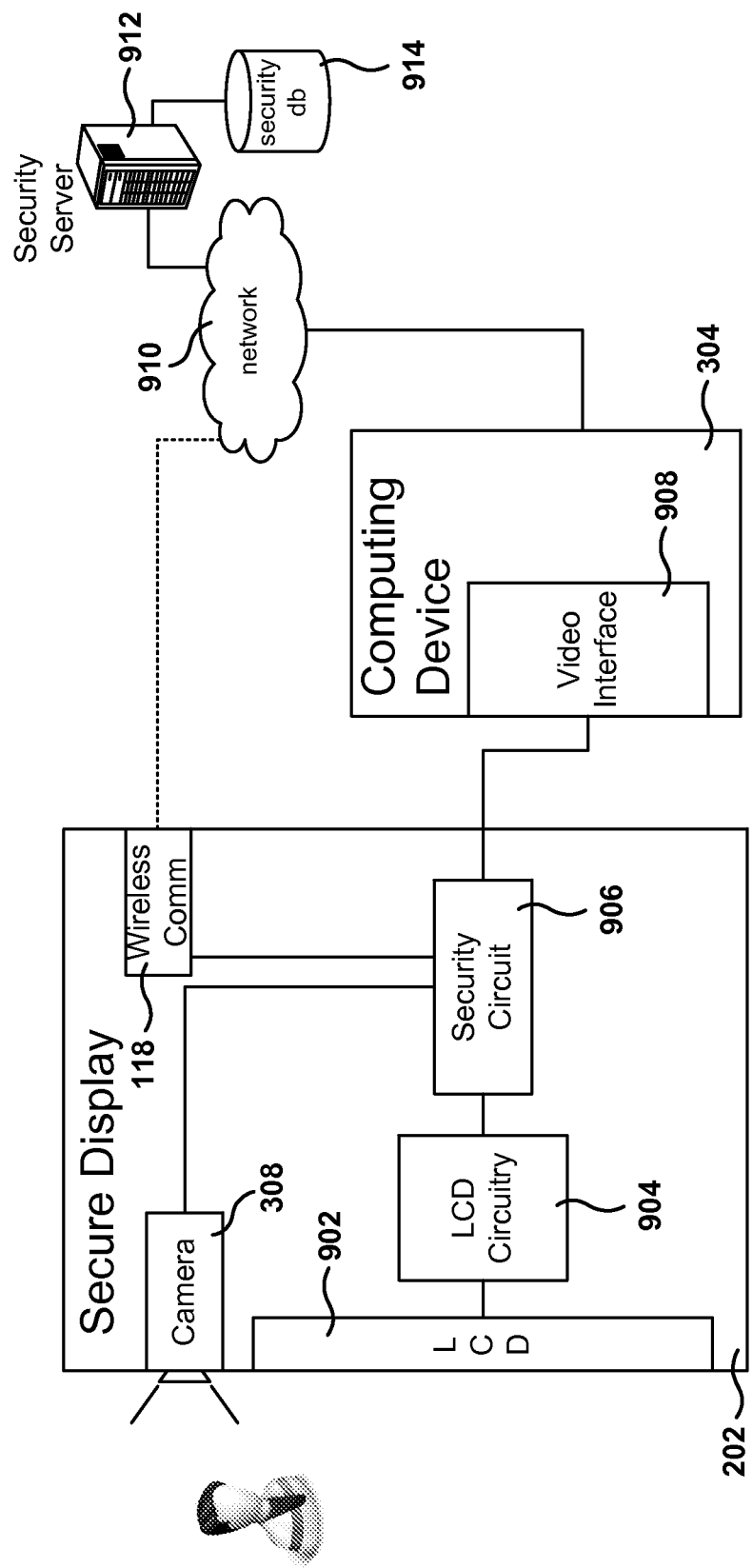
FIG. 9 illustrates an exemplary architecture of a system for providing security utilizing a secure display, according to one embodiment.

FIG. 9 illustrates an exemplary architecture of a system for providing security utilizing a secure display, according to one embodiment. The secure display 202 includes an LCD panel 902 which is driven by LCD circuitry 904, the same components usually found in an unsecured display. In addition, a security circuit 906 is included in the secure display to provide an additional level of security and authentication. The security circuit 906 analyzes images obtained with camera 308 of the user area in front of the display to detect potential security violations, and transmits security and use information via WiFi adapter 118 to a remote security server 912. Security database 914, coupled to the security server 912, is utilized to stored security data from the secure display and from other security displays utilizing the service.

In one embodiment, the secure display is built by adding the security circuit 906, camera 308, and WiFi module 118 to an existing display. In another embodiment, the secure display is built at a factory including all the modules identified in FIG. 9.

Figure 10:
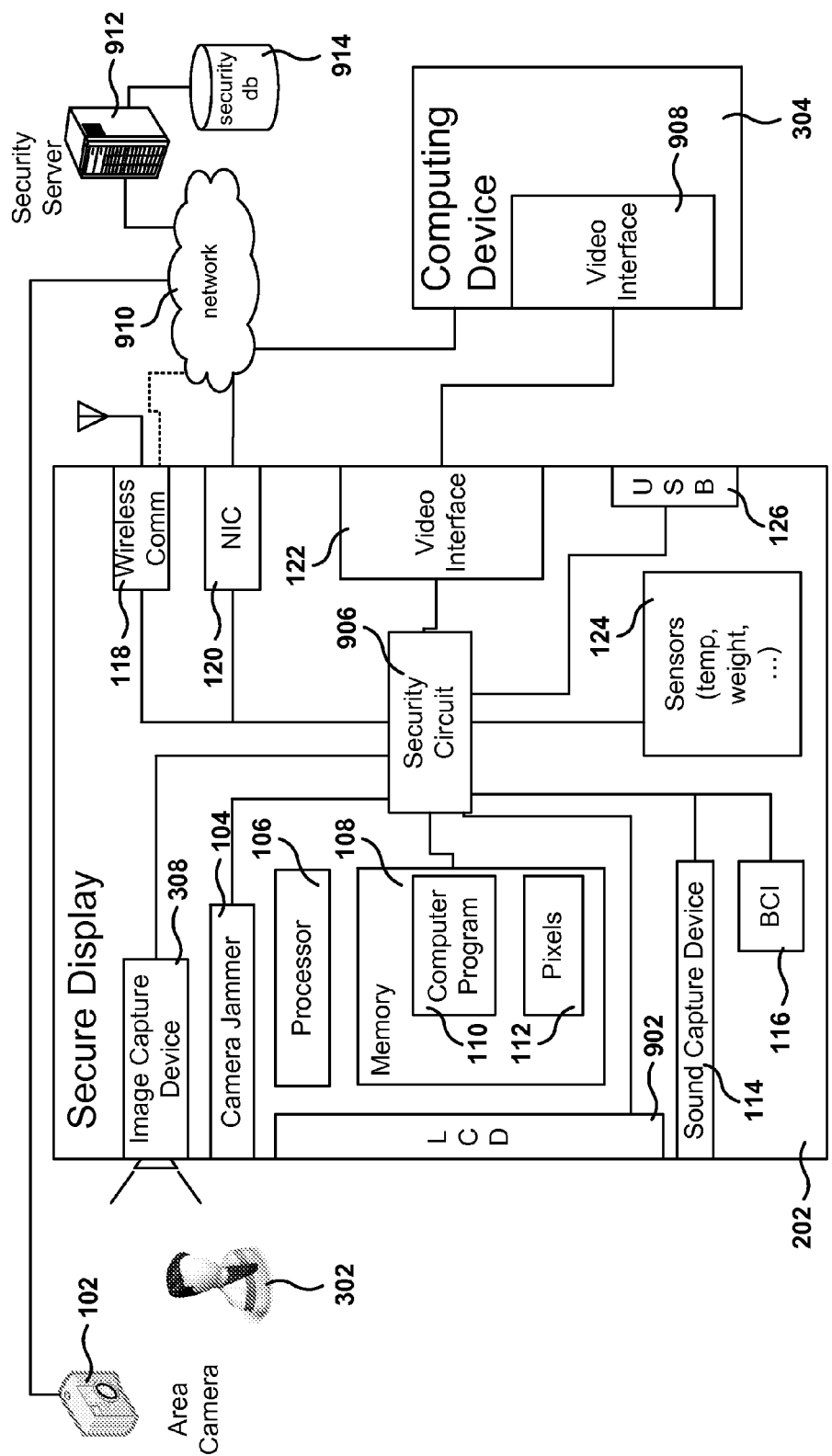
FIG. 10 shows the architecture of a secure display, according to one embodiment.

FIG. 10 shows the architecture of a secure display, according to one embodiment. Secure display 202 includes LCD display 902, processor 106, memory 108, security circuit 906, image capture device 308, camera jammer 104, a wireless communications module 118, a network interface card 120, a video interface 122, a USB connector 126, sound capture device 114, BCI sensor 116, and one or more sensors 124. In one embodiment, the security circuit 906 interfaces with the components from the secure display 202. For simplicity purposes, some interconnections between the modules and the secure display have been omitted not to obscure the details, such as the connection between the processor and the memory, between the memory and the LCD panel, etc.

The security circuit 906 analyzes images captured with image capture device 308, which may be stored in memory 108 or in a dedicated memory within security circuit 906. The image analysis is utilized to provide authentication of the user 302 interfacing with the secure display, as well as for detecting security events related to unauthorized use, such as use by multiple users, user not present in front of the display, an authorized photograph taken of the display, etc.

The security circuit 906 transmits security related data (e.g., see above with reference to FIG. 7) via wireless communication module 118 or via NIC 120. The camera jammer 104 is a device that disables certain cameras from taking pictures in the vicinity of the display. For example, the camera jammer may emit microwave pulses that disrupt the characteristic signals used in the micro circuitry of surveillance cameras, or project a high-intensity laser beam or an infrared beam at a camera. The memory 108 includes a computer program 110 to drive the LCD display, and pixel information 112 for the LCD display.

An area camera 102 takes images of the work area of the user 302, and may include the work area of other users. For example, an area camera 102 may take images of a plurality of cubicles in an office, a hallway in an office floor, an office with several desks, the lobby of a building, etc.

Figure 11:
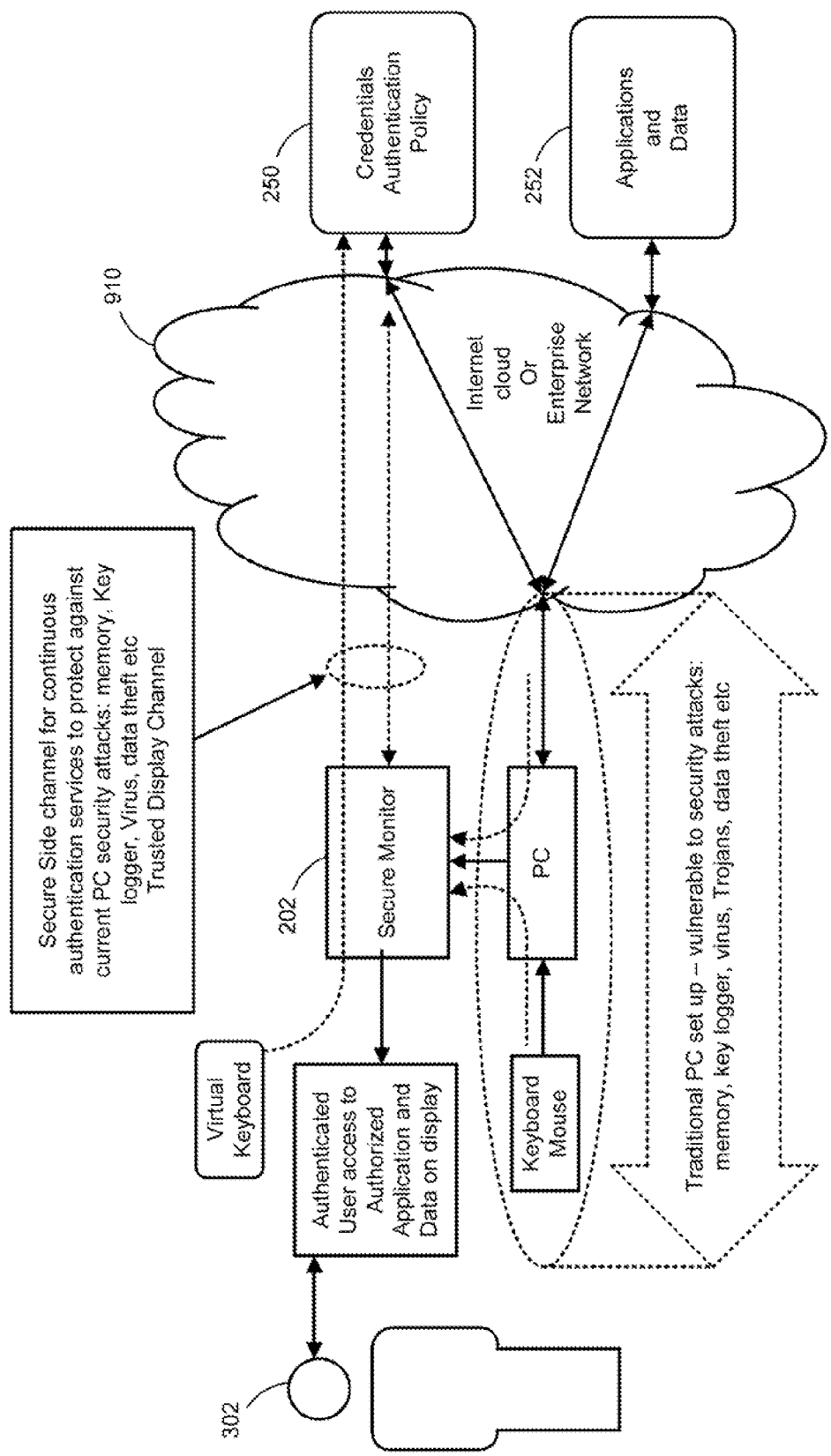
FIG. 11 illustrates the flow of information between the secure monitor and a security server, according to one embodiment.

FIG. 11 illustrates the flow of information between the secure monitor and a security server, according to one embodiment. Besides authenticating the user who is viewing and interacting with the information that is displayed, in one embodiment, the system continuously captures and records the display data that is seen by the user. This display screen data is combined with other meta data, such as a picture of the user from the sensor cameras, the IP address and MAC address of the computer attached to the display, time and date, application in use and associated application data (e.g., e-mail and the contents of an e-mail message, word processor and entered text, web browser and websites visited), etc. In one embodiment, the information is stored locally in encrypted form in local memory (e.g., embedded disk, flash memory storage, etc.) and then sent to external cloud storage via the side channel network interface.

Figure 12:
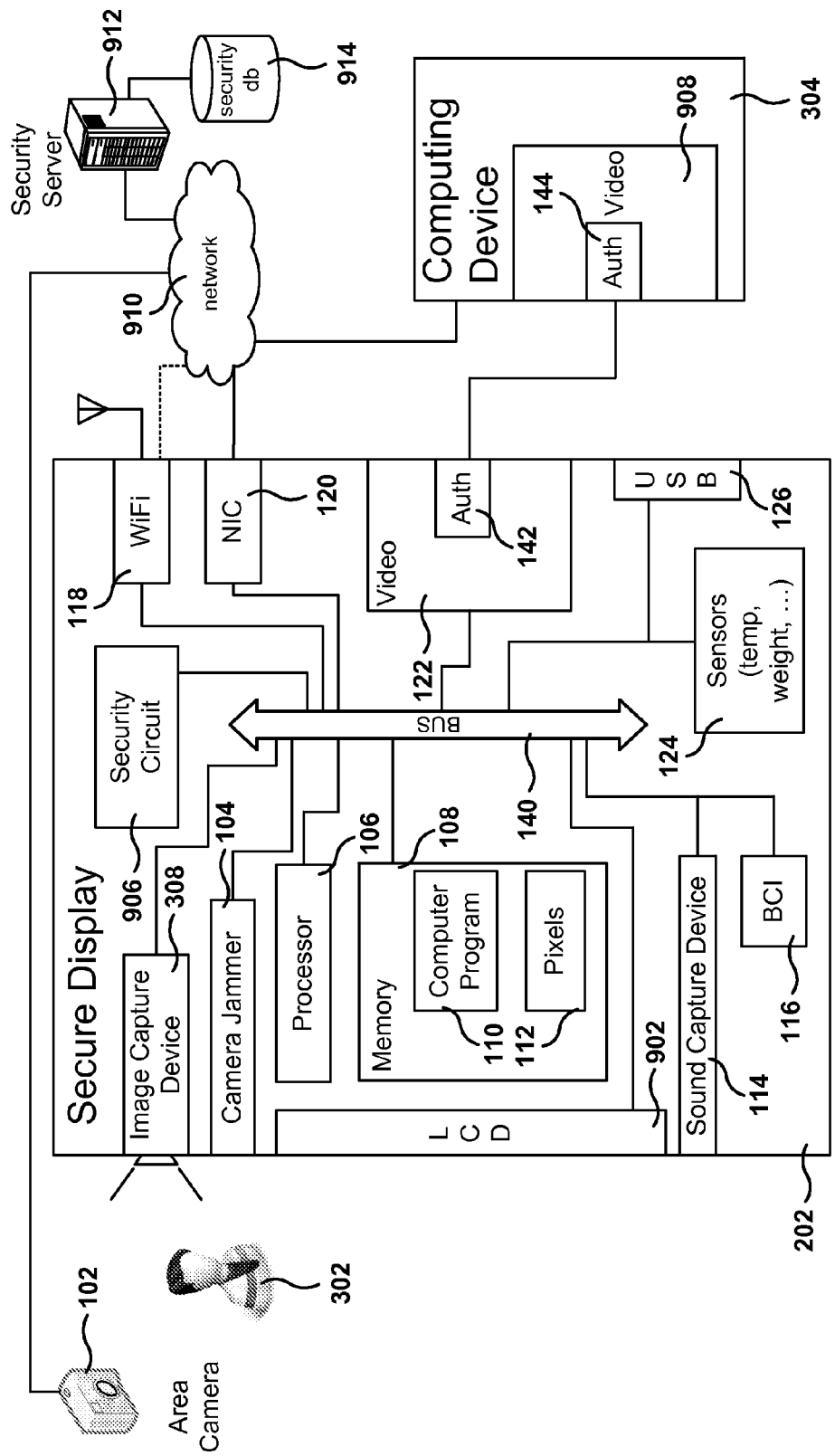
FIG. 12 shows an alternative architecture of a secure display, according to one embodiment.

FIG. 12 shows an alternative architecture of a secure display, according to one embodiment. The embodiment of a security display 202 is similar to the embodiment of FIG. 10, but utilizes a bus structure 140 for exchanging data between the modules in the secure display.

The security circuit 906 is attached to the bus 140 and controls the output to LCD 902, by interfacing with the circuitry that drives the LCD 902 (e.g., processor 106 and pixel memory 112). In addition, the security circuit 906 interfaces with WiFi module 119 to send security data to security server 912 and to receive security and configuration commands from security server 912. In one embodiment, the security server sends authorized user information to the security server 906 information regarding the users authorized to utilize the secure display, the policy rules for implementing security in the secure display, login parameters, authenticated devices that may be utilized secure display 202 (e.g. computing device 304), etc.

In one embodiment, the security circuit 906 manages the authentication of the host computing device via an authentication module 142 embedded in the video interface 122 coupled to the video interface 908 in the host. In one embodiment, Trusted Platform Module (TPM) authentication is utilized, but other methods of authentication are also possible. TPM is both the name of a published specification detailing a secure cryptoprocessor that can store cryptographic keys that protect information, as well as the general name of implementations of that specification, often called the "TPM chip" or "TPM Security Device".

The Trusted Platform Module offers facilities for the secure generation of cryptographic keys, and limitation of their use, in addition to a hardware pseudo-random number generator. It also includes capabilities such as remote attestation and sealed storage. "Remote attestation" creates a nearly unforgeable hash-key summary of the hardware and software configuration. The program encrypting the data determines the extent of the summary of the software. This allows a third party to verify that the software has not been changed. "Binding" encrypts data using the TPM endorsement key, a unique RSA key burned into the chip during its production, or another trusted key descended from it. "Sealing" encrypts data in similar manner to binding, but in addition specifies a state in which the TPM must be in order for the data to be decrypted (unsealed). Software can use a Trusted Platform Module to authenticate hardware devices. Since each TPM chip has a unique and secret RSA key burned in as it is produced, it is capable of performing platform authentication. For example, it can be used to verify that a system seeking access is the expected system. Generally, pushing the security down to the hardware level in conjunction with software provides more protection than a software-only solution.

Figure 13:
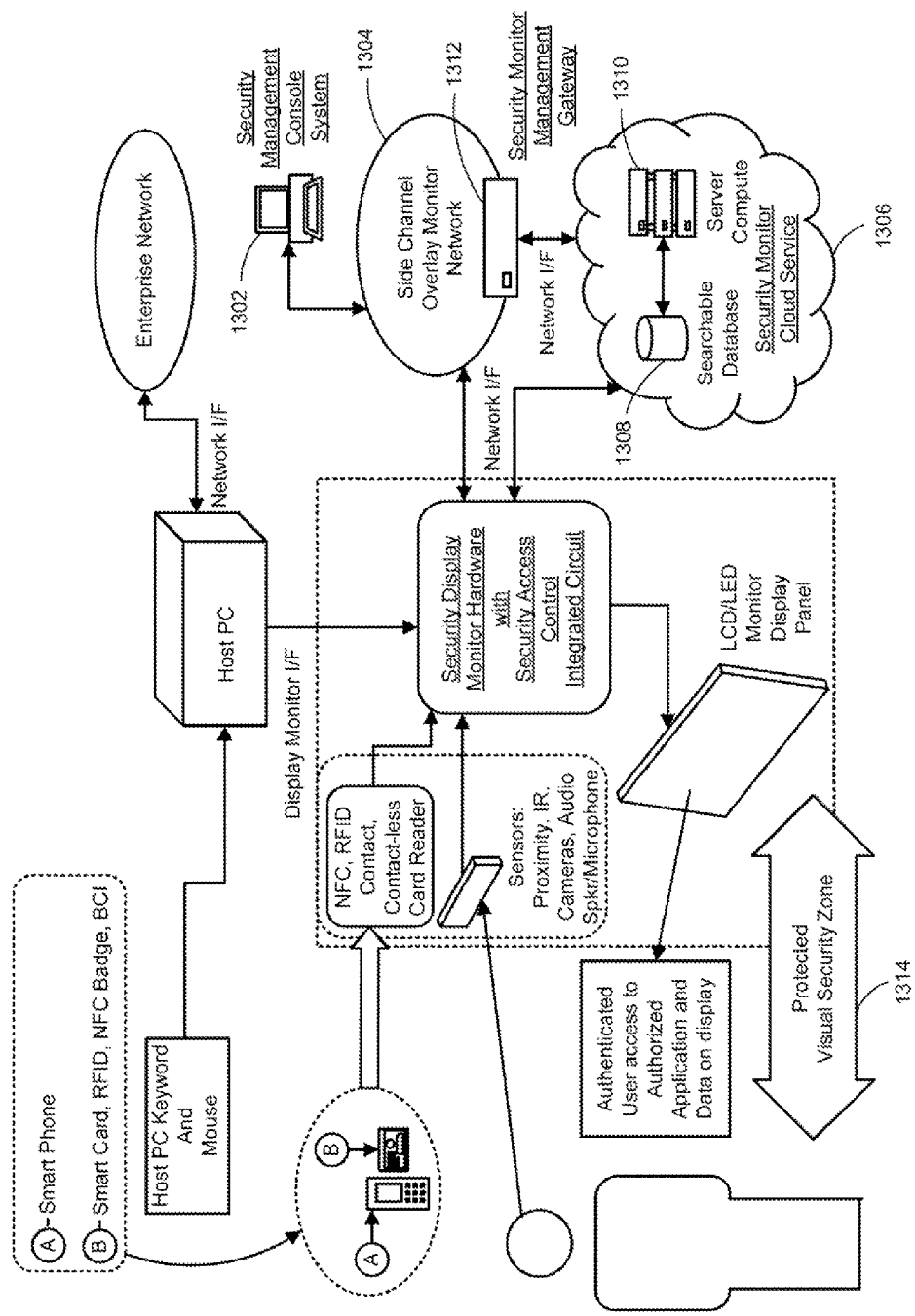
FIG. 13 illustrate the flow of information associated with the secure display, according to one embodiment.

FIG. 13 illustrates the flow of information associated with the secure display, according to one embodiment. In one embodiment, a side channel overlay monitor network 1304 is utilized with a goal to secure the information provided by one or more remote secure monitors. The security management console system 1302 provides access to management and administrative functions for the security system. In one embodiment, a GUI is provided to interface with the security management console system 1302, such as the GUI described below with reference to FIG. 19.

In one embodiment, a security monitor cloud service provides storage 1308 and processing capacity 1310 for performing security related operations, such as searching security data, analyzing data, detecting possible threats within the data, etc. A security monitor management gateway 1312 acts as the interface between the security management console system 1302 and the security monitor cloud service 1306.

In one embodiment, the computing resources 1310 are utilized for implementing the security policy, as defined by the administrator utilizing the security management console system 1302. In one embodiment, the security policy comprises a plurality of security rules, where each security rule defines one or more actions to be performed when certain conditions are met.

In one embodiment, security monitor cloud service 1306 is also utilized to monitor the out-of-band communications originated at the protected visual security zone 1314, such as mobile telephony communications, or any other type of wireless or wired communications taking place within the protected visual security zone 1314.

Figure 14:
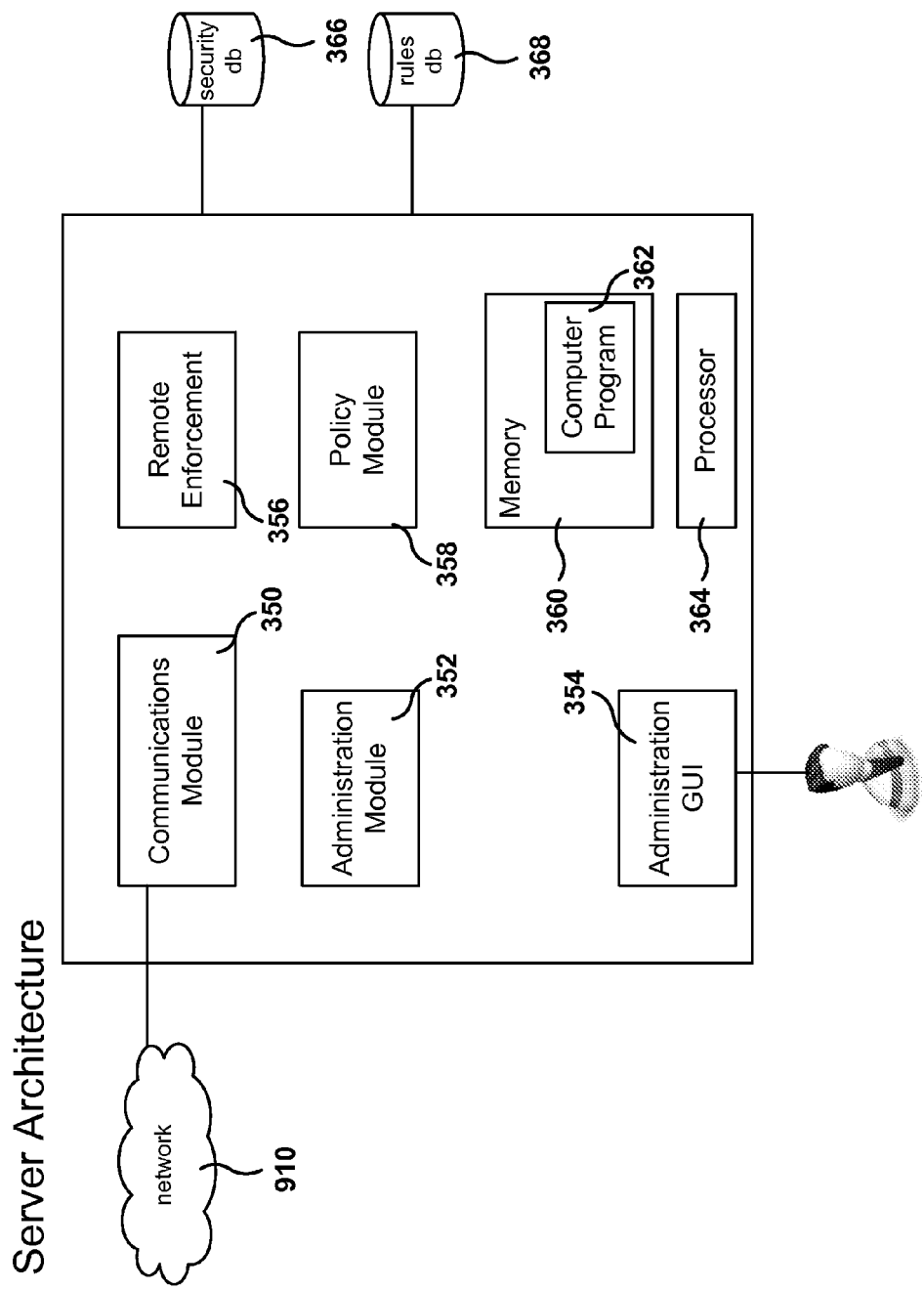
FIG. 14 illustrates an exemplary architecture of the security server, according to one embodiment.

FIG. 14 illustrates an exemplary architecture of the security server, according to one embodiment. The security server 912 includes a communications module 350, an administration module 352, an administration GUI 354, a remote enforcement module 356, a policy module 358, memory 360, and processor 364. In addition, a security database 366 and a policy rules database 368 are in communication with the server 912.

The communications module 350 manages the communications with the remote secure displays, as well as other network communications regarding the management and administration of the secure server architecture. The administration module 352 provides options, user interfaces, help, etc. regarding the administration of the secure environment. An administration GUI 354 provides a user interface for authenticating access by one or more administrators and for setting the administration parameters required to configure, update, delete, service, etc., the security architecture service.

The remote enforcement module 356 exchanges management and control messages with the secure terminals, and more specifically with the security circuitry in the secure terminals. For example, the remote enforcement module 356 may send commands to a security display regarding policy rules be implemented at the secure terminal, users authenticated to use the secure display, hosts computers authenticated to interface with the secure display, authentication keys, instructions to disable or enable the remote display, etc. The remote enforcement module 356 manages the data stored in a secure database 366, including all the information received from secure displays.

The policy module 358 manages the security policy and the rules comprising the security policy, regarding the authorized use of secure displays. The security policy rules may be configured via the administration GUI 354. More details with reference to policy rules are given below with reference to FIG. 18. The security policy rules are stored in rules database 368.

It is noted that the embodiment illustrated in FIG. 14 is exemplary. Other embodiments may utilize different modules, fewer modules, additional modules, or combine the functionality of two or more modules into one module. In addition, the functionality of the remote secure server may be distributed over a plurality of security servers. The embodiments illustrated in FIG. 14 should therefore not be interpreted to be exclusive or limiting, but rather exemplary or illustrative.

Figure 15:
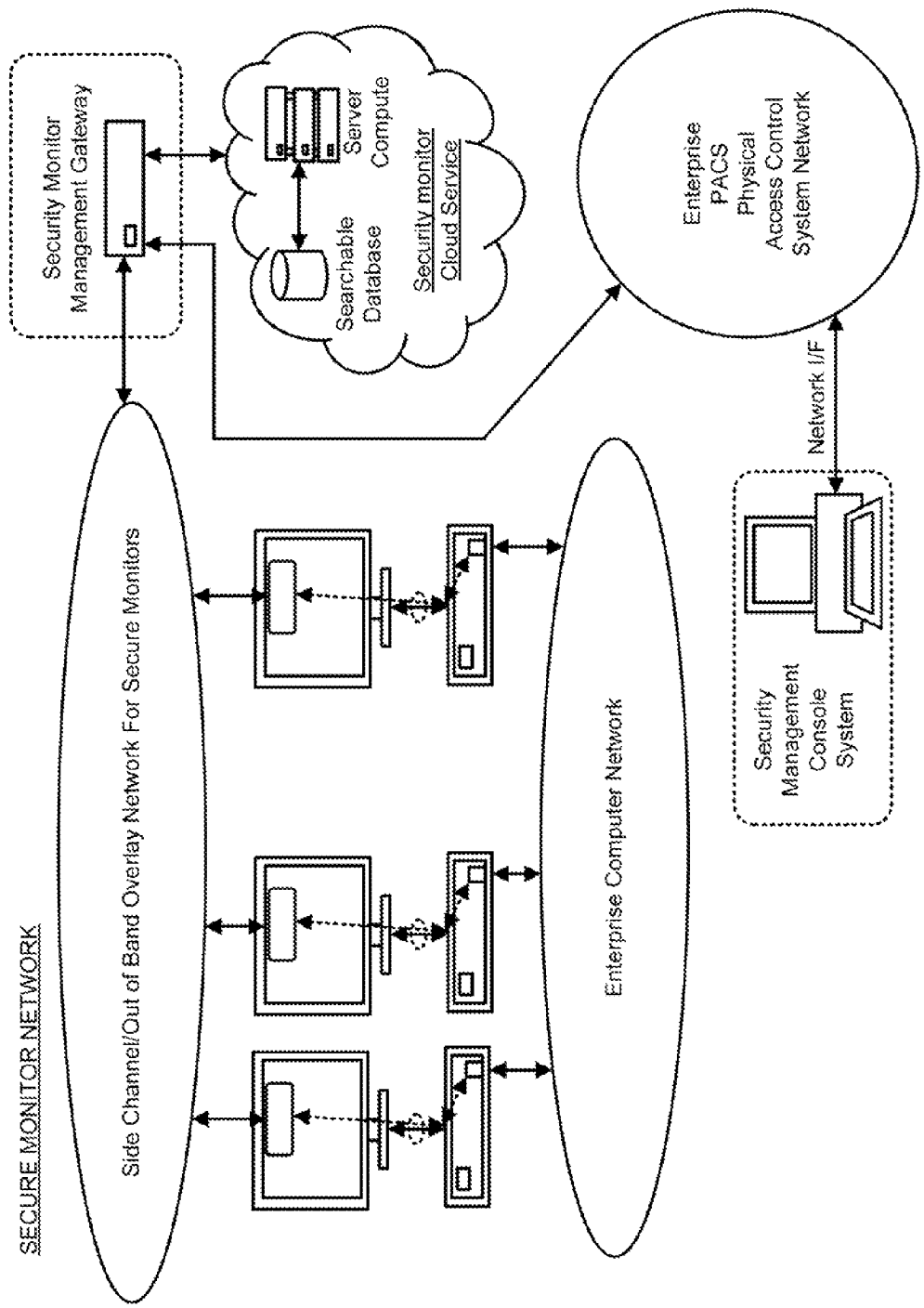
FIG. 15 illustrates the monitoring of a plurality of work stations, according to one embodiment.

FIG. 15 illustrates the monitoring of a plurality of work stations, according to one embodiment. The secure display system interfaces with the remote secure monitors via a side channel or out of band overlay network separate from the enterprise network utilized by the hosts attach to the secure displays.

In one embodiment, separate enterprise physical access control system (PACs) network is utilized to connect the secure monitor management gateway to the security management console system.

Figure 16:
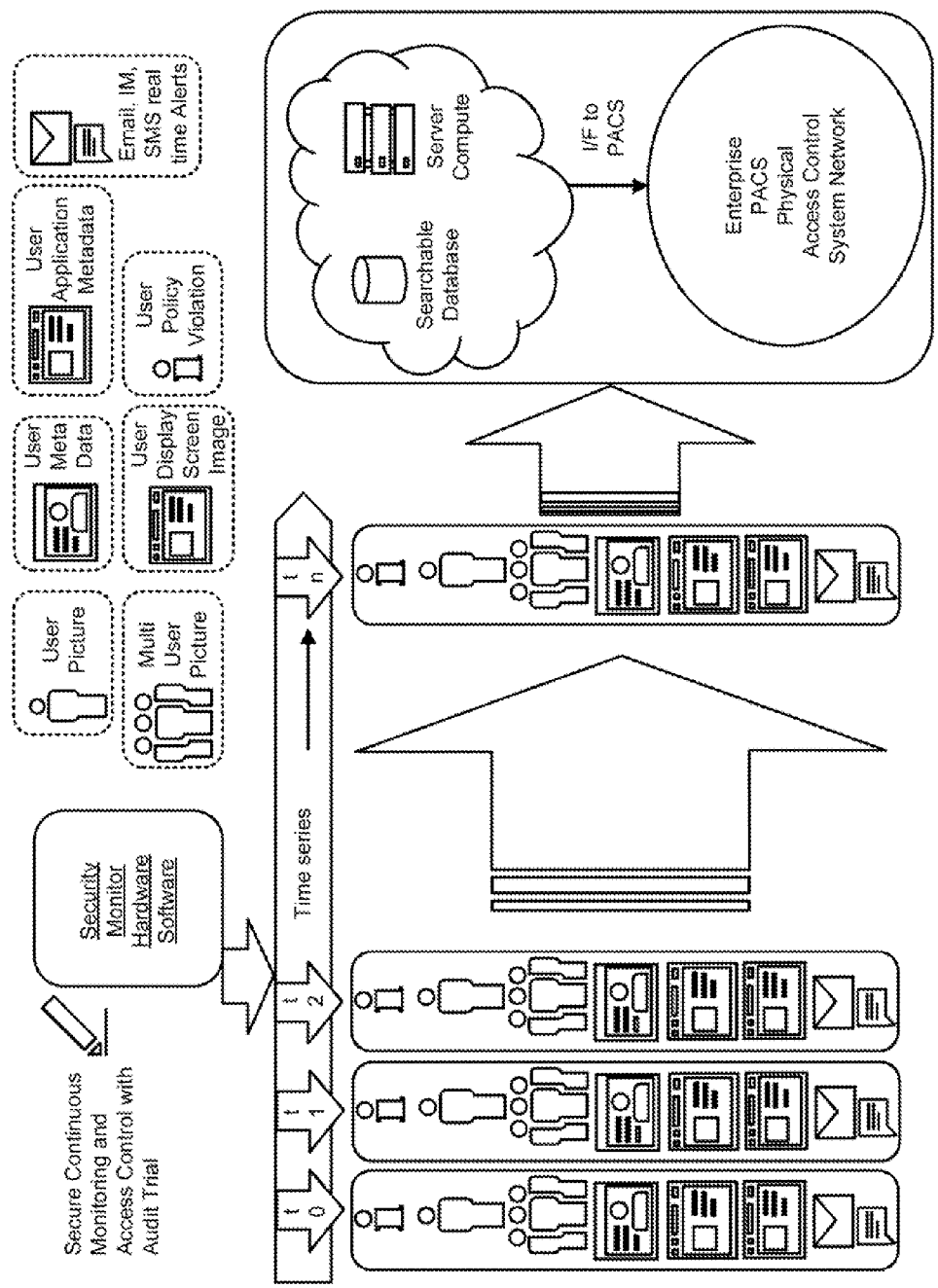
FIG. 16 illustrates the flow of information from the client, according to one embodiment.

FIG. 16 illustrates the flow of information from the client, according to one embodiment. The data logged by the secure display is captured over time (t0, t1, t2, . . . tn), and may include a plurality of information items, within a plurality of different categories (e.g., user image, host authentication, screen captures, e-mail access by user, word processor access by the user, etc.). The data attesting the user's physical presence along with the video screen display is stored for audit trail. In addition, the data supporting the users attributes serve as a meta data enabling searches on the stored data.

The logging of data is event driven, as discussed above. In one embodiment, the events may fall within different categories, such as normal events, exceptional events, administration events, etc. In addition, the events may be time sliced, that is, a plurality of data items related to the secure display are captured simultaneously.

In one embodiment, a GUI is provided to users of the secure displays in order to enable the users to view or get limited access to the information logged by the secure system. The user may be given total or partial access to the information. In one embodiment, the user is able to select an option to request the deletion of some data from the system. For example, a user may identify that during a certain period of time the user was accessing personal information on the display, and the user may wish to have the information removed from the system. An administrator will then determine if the request is granted or denied.

In one embodiment, user feedback is provided via a signal light similar to a video camera. The "light is on" indicator signals that "recording" is taking place. The secure monitor may also provide audio cues including different tones or computerized voice message, etc. The audio cues alert the user that their activity is being actively tracked.

In another embodiment, software selectable buttons are provided via a software menu or via hardware buttons on the monitor, similar to the buttons on a DVR for play back of activities at any time. The alert light and the playback reinforce the message that their activity has been recorded and available for anyone to "see" including themselves, thus eliminating the "opportunity" for theft, enabling "rationalization" of good citizen behavior, reducing incentives ROI for quick profit, etc. The hardware or software buttons may also be controlled via access control so that only the appropriate user can access the stored data.

Figure 17:
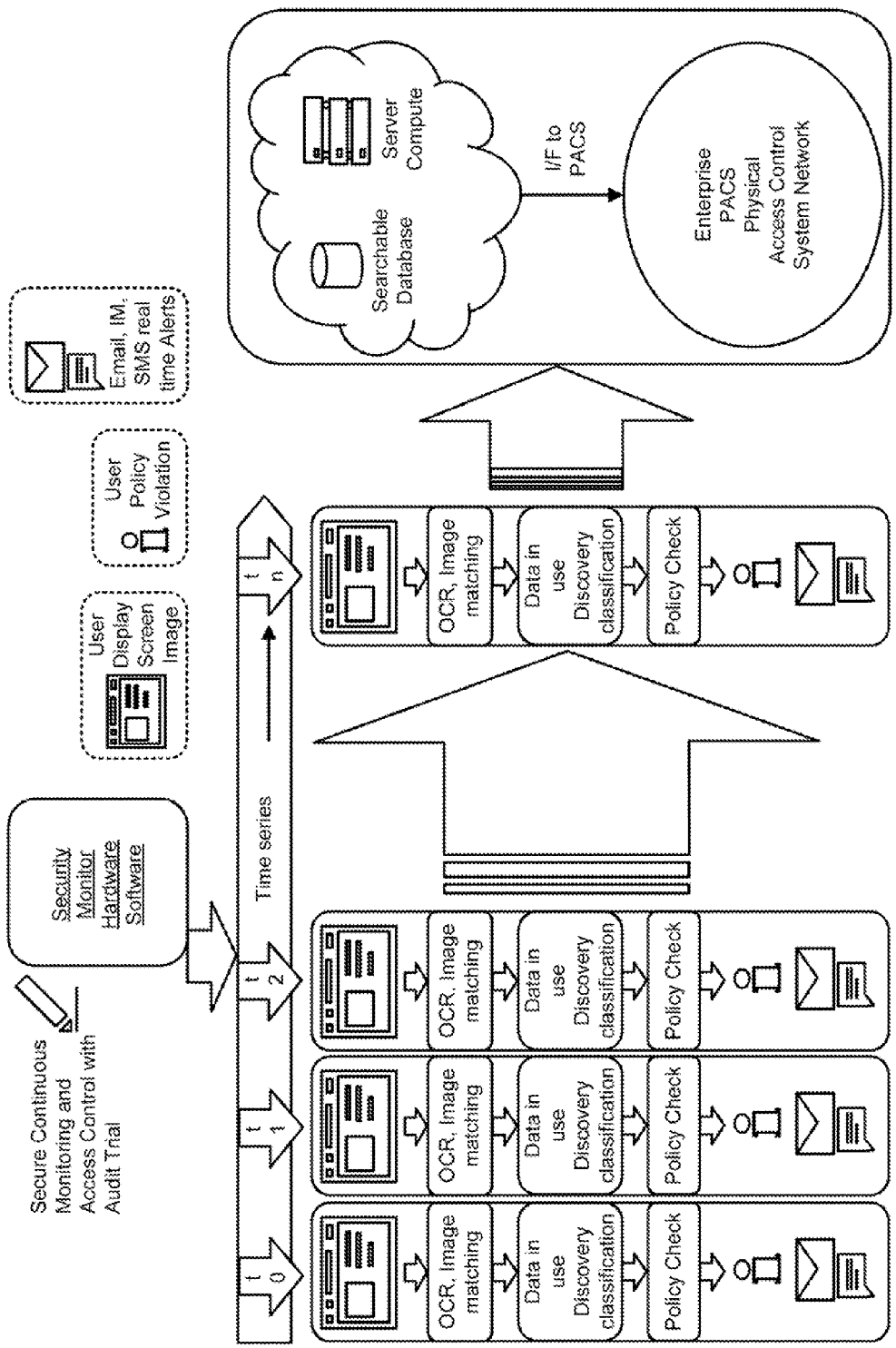
FIG. 17 illustrates an implementation of policy rules and the generation of alerts, according to one embodiment.

FIG. 17 illustrates an implementation of policy rules and the generation of alerts, according to one embodiment. In one embodiment, Optical Character Recognition (OCR) is utilized to analyze the text embedded within a screen capture of the display pixels. The detected OCR data is run against the defined policy rules (e.g. policy checks). The result of applying the policy rules may be a log of the data, the generation of an alert, etc. The alerts may be in the form of an e-mail, a page message, a text message, a videoconference call, a phone call, etc., in order to alert one or more administrators. The alerts may include information regarding the security-policy violations.

In one embodiment, tagging the image of a user to the computer interactions enables the tracking of computer generated transactions regarding applications and data, utilizing the user image as the tag or key. Additionally, other tags may also be utilized for searches, such as a computer display screen image. Thus, data might be searched utilizing the user image key, a screen capture, time, location, etc., in order to better track user's activities.

By linking the image key to other meta data such as IP address, MAC address, CPU ID, etc., it is possible to track, search and manage user activities by linking these keys to existing network and server log commercial product solutions.

In one embodiment, and Application Programming Interface (API) is provided to enable data access on user image key, screen image key, or some other capture security information. Current network and server log management often involve complex user interfaces. For example, some search approaches utilize Regex operations extensively. By using the "user image" key approach, log maintenance interface and activity is improved since humans are better at using visual techniques when compared to computers.

In one embodiment, the API enabling the use of user image keys and display screen keys, plus the associated metadata, to interface with, is used to enhance existing video surveillance equipment and physical access control products.

In one embodiment, the user image key may be utilized at point-of-sales (POS) terminals to provide secure transactions while eliminating the threats of credential attacks. In addition, in one embodiment, the display screen image is utilized, by performing OCR, to extract and track itemized transaction details, such as product, price, store, aisle location, cash paid, credit debit card used, coupons used, etc.

In one embodiment, the POS retail user data is gathered to provide custom services such as expense tracking, serving shopping deals, etc., by providing arbitrage interfaces to commerce, such as a shop retailer, a bank or a product vendor. In addition, it is possible to enhance Bank, remote teller ATM, ACH, mobile payments transactions security, to eliminate physical credential attacks that are common today.

FIG. 18 is an exemplary table of policy rules, according to one embodiment. A security rule defines one or more actions to be taken when one or more conditions occur. The actions may include one or more of locking down a display, disabling the display, enabling the display, logging information, capturing information (e.g., a photo of the user, screen capture, etc.), setting up an alert for the administrator, producing a warning message on the display for the user (e.g., "caution another person is behind you"), sounding an alarm, sending an e-mail or some other form of communication, etc.

The events that may trigger a policy rule may include one or more of a timer expiring, detection of a security threat, detection of an unauthorized user, detection of the use of an unauthorized application, setting a timer, detection of a photo taken of the display, detection of multiple users in front of the display, detection of an unauthorized user, detection of voices or other sounds near the display, detection of the temperature above a certain threshold temperature, detection of an RFID card near the secure display, detection of the establishment of a mobile phone call near the display, etc.

In one embodiment, a plurality of conditions associated with events may be combined utilizing logical operators (e.g., AND, OR, NOT, etc.). The policy rules may be implemented at the central security server, at the secure display, or both at the secure display and a central security server. In one embodiment, a first set of rules is downloaded to the secure display for implementation by the security circuitry inside the secure display. In addition, a second set of rules is implemented at the central security server.

In another embodiment, a third set of rules are implemented that correlate information regarding more than one secure terminal. For example, a policy rule may define to set up an alarm when all the secure displays in a room are left alone (e.g., there is no user sitting in front of any of the secure displays).

Figure 19:
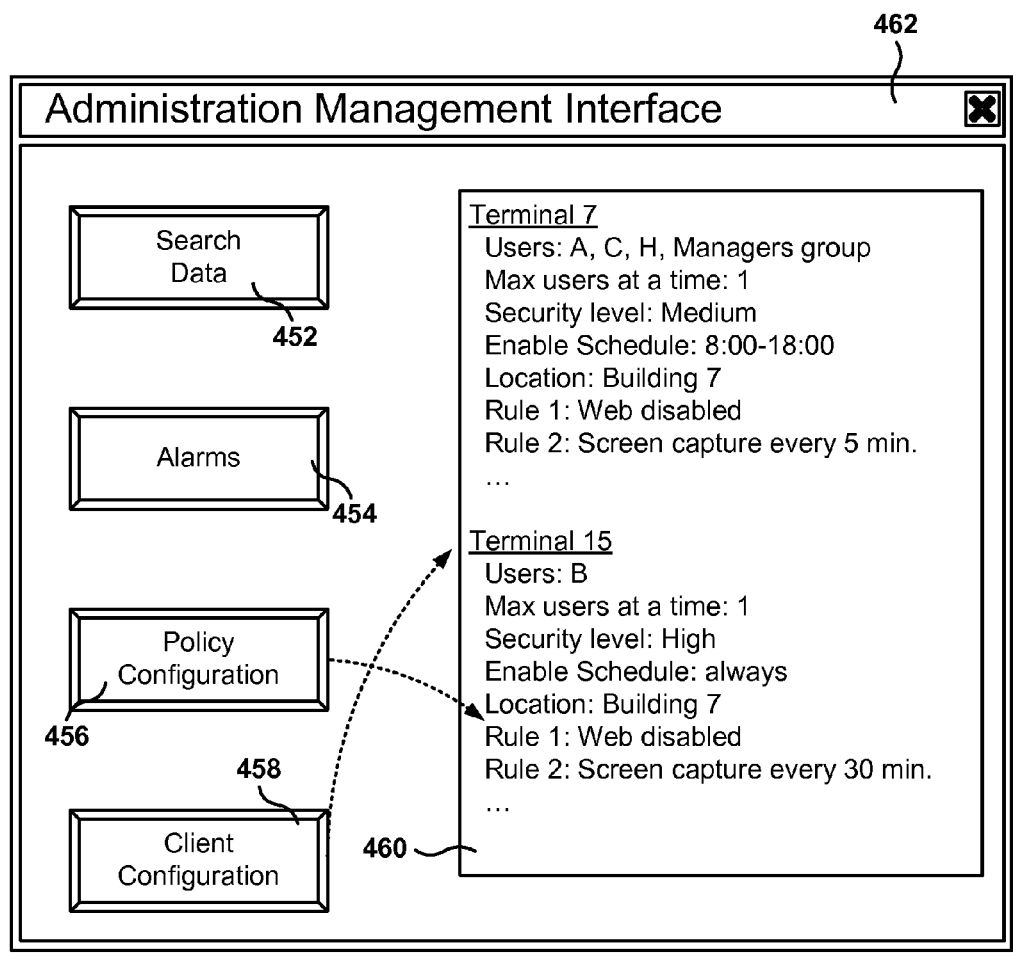
FIG. 19 shows an exemplary administration Graphical User Interface (GUI), according to one embodiment.

FIG. 19 shows an exemplary administration Graphical User Interface (GUI), according to one embodiment. The GUI administration management interface 462 includes options for the administrator as well as an information window 460. The options include search data 452, alarms 454, policy configuration 456, and client configuration 458.

The option to search data 452 opens a new window that enables the administrator to enter search parameters for searching the security database. The search parameters may include a period of time, user ID, display ID, log data (e.g., "find users from building 7 that were using the word processor on Monday between 1:00 PM and 3 PM"), etc.

The alarms option 454 provides a separate window to set alarms, modify alarms, delete alarms, or review alarm information created by the system. The policy configuration 456 option enables administrator to set the policy rules, such as those described above with reference to FIG. 18. The administrator has the option to configure rules that are enforced at the remote display or that are enforced at the central security server, or both.

The client configuration option 458 enables the administrator to modify the client configuration (e.g., add, delete, or modify users or remote displays). Information window 466 shows a partial listing of terminal information, including user is authorized to use the remote terminal, maximum number of users that can use the terminal of the time, security level of the terminal, enabled schedule of operation, location of the terminal, policy rules for the terminal, etc.

It is noted that the embodiment illustrated in FIG. 19 is exemplary. Other embodiments may utilize different options, layouts, etc. The embodiment illustrated in FIG. 19 should therefore not be interpreted to be exclusive or limiting, but rather exemplary or illustrative.

Figure 20:
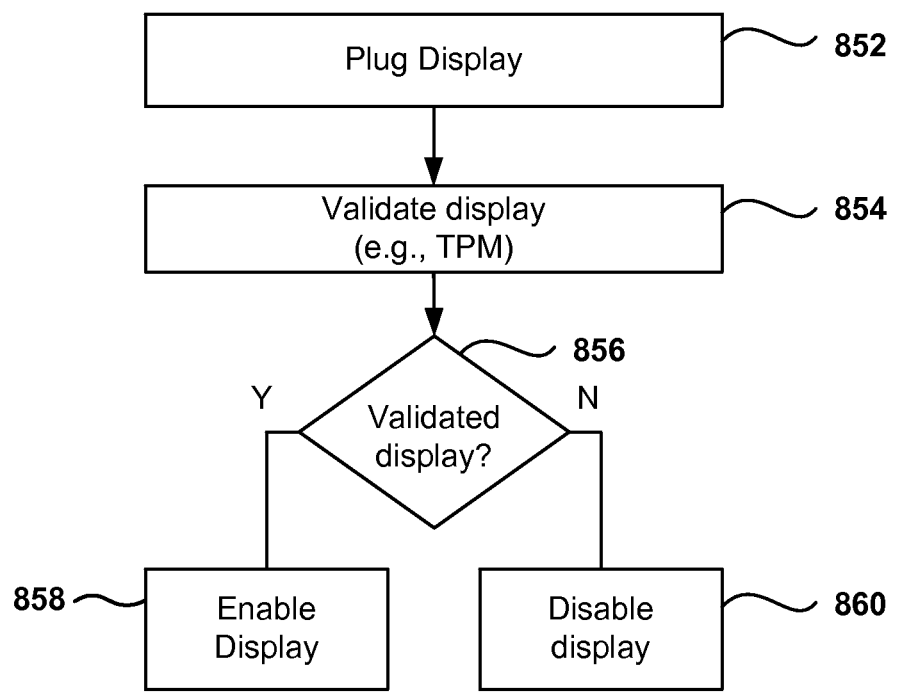
FIG. 20 shows the flow of a method for validating a display, according to one embodiment.

FIG. 20 shows the flow of a method for validating a display, according to one embodiment. In operation 852, the system detects that the display has been plugged in, that is, connected to a host computing device. From operation 852, the method flows to operation 854 when the display is validated. In one embodiment, the display is validated utilizing TPM, but other methods of authentication are also possible. In addition, the validation of the display is based on the policy rules set for the secure display.

From operation 854, the method flows to operation 856 where a check is made regarding the validity of the display. If the display is validated, the method flows to operation 858 when the display is enabled, and if the display is not enabled the method flows to operation 860, where the display is disabled.

Figure 21:
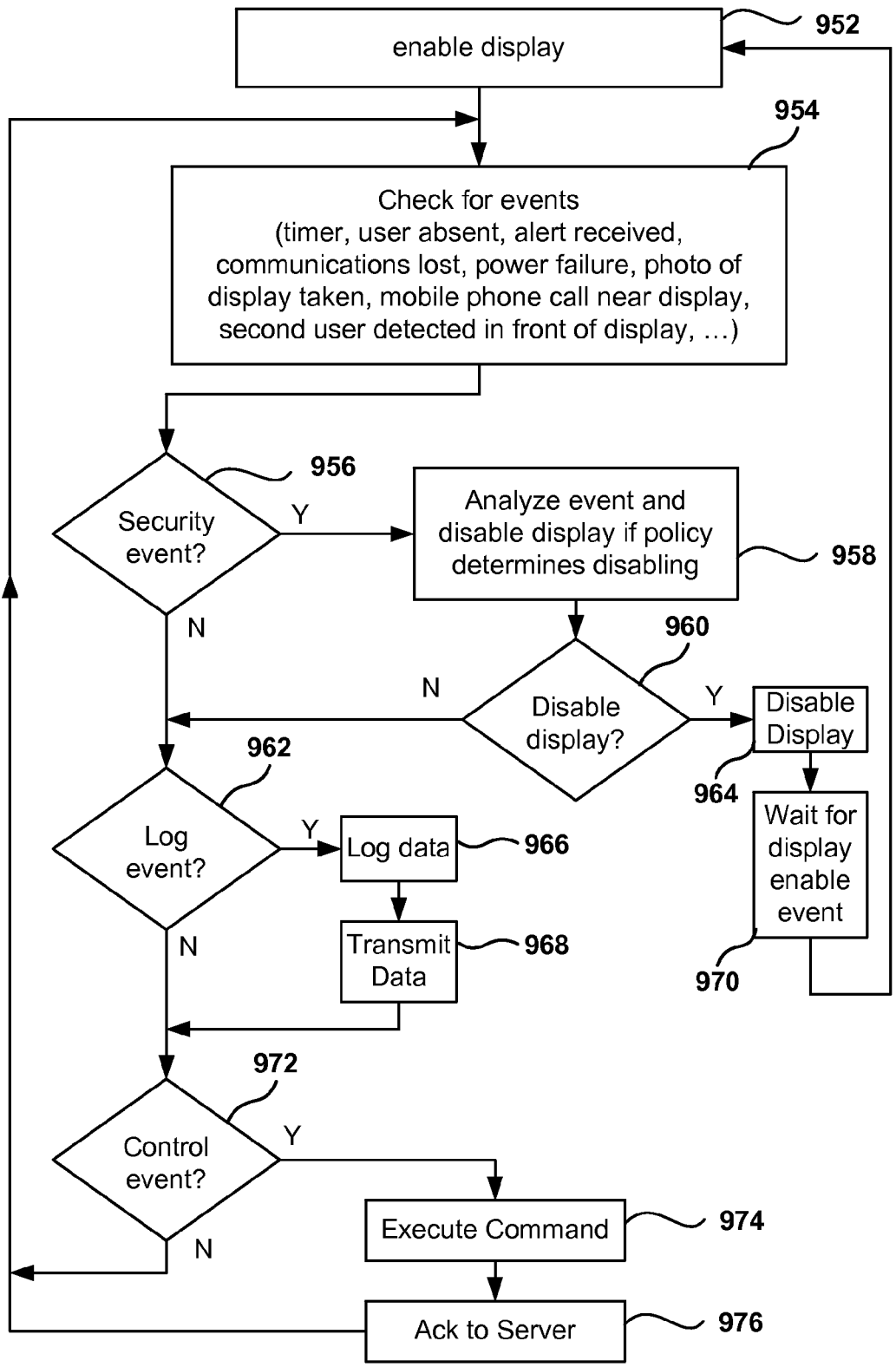
FIG. 21 shows the flow of a method for monitoring events at the secure display, according to one embodiment.

FIG. 21 shows the flow of a method for monitoring events at the secure display, according to one embodiment. In operation 952, the use of a secure display is enabled (e.g., see for example the method to enable a display described above with reference to FIG. 20). From operation 952, the method flows to operation 954, where a check for a security event is made. As described above, the security events might be of different kinds, and may include a timer expiring, a user walking away from the display, receipt of an alert, etc.

From operation 954 method flows to operation 956, where a check is made to determine if the event detected in operation 954 is a security-related event. In one embodiment, a security event is an event resulting from the triggering of the conditions of one or more policy rules, but other types of security events are also possible.

If a security event is detected the method flows to operation 958, where the event is analyzed. In one embodiment, the remote display is disabled 964 if the security policy determines 960 that the security event requires disablement of the remote display. In addition, other types of actions may be performed based on the security event, as described above with reference to FIG. 18. From operation 964, the method flows to operation 970 where the system waits for an event that triggers the re-enablement of the remote display.

From operation 956, the method flows to operation 962 where a check is performed to determine if the security event requires logging data. If data needs to be logged, the method flows to operation 966 to log the data, and to operation 968 to transmit the data to the remote security server.

In operation 972, a check is performed to determine if the event is a control event. In one embodiment, a control event is a command received from the secure server to be performed by the secure display, although other type of control events are also possible. If the security event is a control event, the method flows to operation 974 where the command associated with the control event is executed, and an acknowledgment that the command has been performed is sent back to the server, in operation 976. From operation 976, the method flows back to operation 954 to check for new security events.

Figure 22:
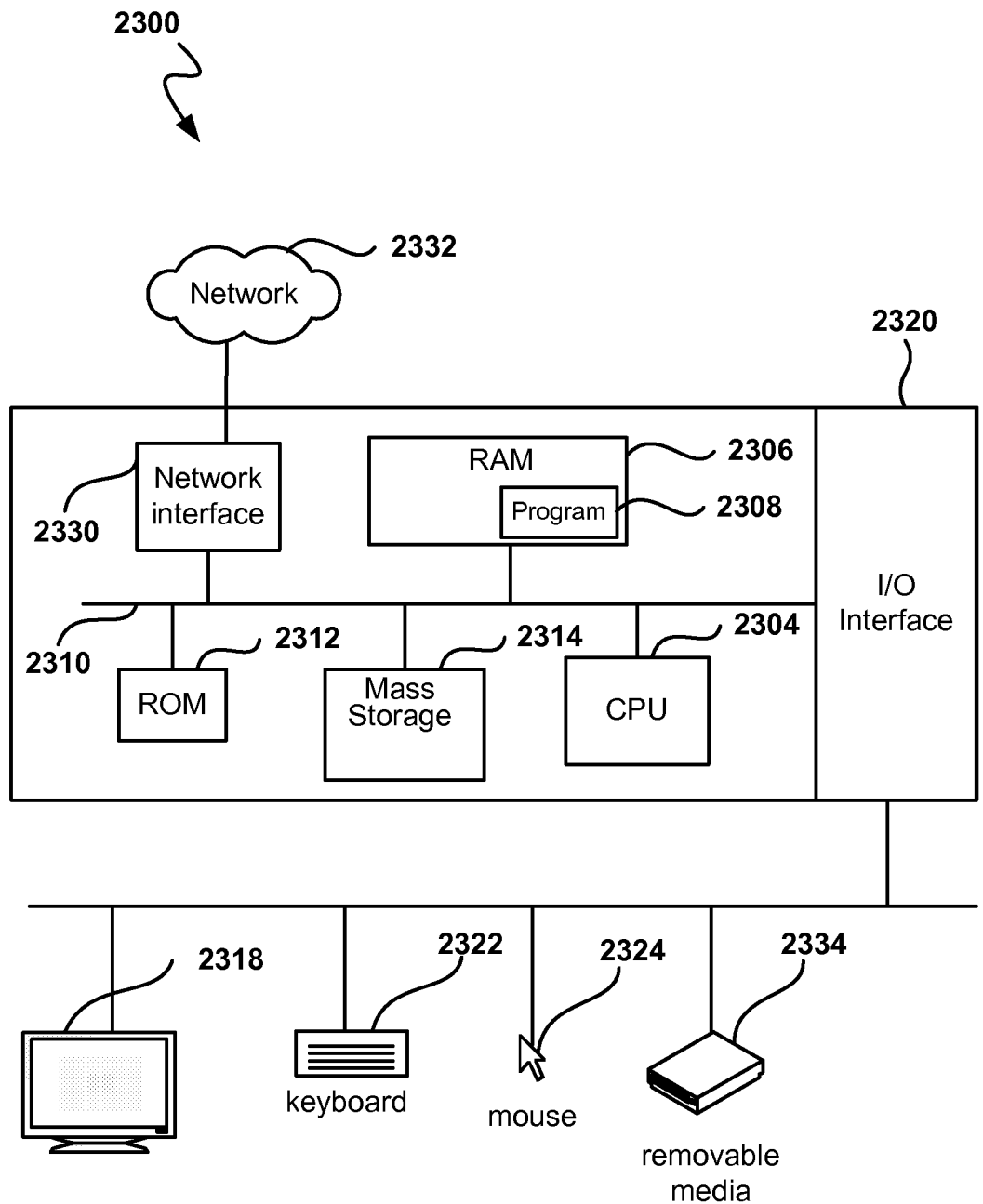
FIG. 22 is a simplified schematic diagram of a computer system for implementing embodiments of the present disclosure.

FIG. 22 is a simplified schematic diagram of a computer system for implementing embodiments of the present disclosure. FIG. 22 depicts an exemplary computer environment for implementing embodiments of the disclosure. It should be appreciated that the methods described herein may be performed with a digital processing system, such as a conventional, general-purpose computer system. Special purpose computers, which are designed or programmed to perform only one function, may be used in the alternative. The computer system includes a central processing unit (CPU) 2304, which is coupled through bus 2310 to random access memory (RAM) 2306, read-only memory (ROM) 2312, and mass storage device 2314. Computer program 2308 for providing a security display resides in random access memory (RAM) 2306, but can also reside in mass storage 2314.

Mass storage device 2314 represents a persistent data storage device such as a floppy disc drive or a fixed disc drive, which may be local or remote. Network interface 2330 provides connections via network 2332, allowing communications with other devices. It should be appreciated that CPU 2304 may be embodied in a general-purpose processor, a special purpose processor, or a specially programmed logic device. Input/Output (I/O) interface provides communication with different peripherals and is connected with CPU 2304, RAM 2306, ROM 2312, and mass storage device 2314, through bus 2310. Sample peripherals include display 2318, keyboard 2322, cursor control 2324, removable media device 2334, etc.

Display 2318 is configured to display the user interfaces described herein. Keyboard 2322, cursor control 2324, removable media device 2334, and other peripherals are coupled to I/O interface 2320 in order to communicate information in command selections to CPU 2304. It should be appreciated that data to and from external devices may be communicated through I/O interface 2320. The embodiments can also be practiced in distributed computing environments where tasks are performed by remote processing devices that are linked through a wire-based or wireless network.

A1. A display device for presenting information output of a host computer, comprising, a panel defined from a plurality of light emitting devices that are arranged to define an area for displaying the information output from the host computer;

display logic for receiving pixel data from the host computer to be displayed on the panel;

a sensor for capturing data proximate to the panel;

an integrated circuit disposed in communication with the display logic and the panel, the integrated circuit configured to intercept or examine the information output from the host computer, the data of the sensor being analyzed for security control while enabling the information output to be presented to the display logic, wherein the display processor causes the light emitting devices of the panel to activate and the sensor for capturing data is configured to trigger a plurality of times during a use of the panel; and a communication device for enabling the integrated circuit to communicate with a remote computer without communication with the host computer.

A2. The panel of claim A1, wherein the security control is configured to validate policies for the data captured proximate to the panel.

A3. The panel of claim A1, wherein the security control is configured to disable transfer of the intercepted information from being displayed on the panel by the display processor.

Embodiments of the present disclosure may be practiced with various computer system configurations including handheld devices, microprocessor systems, microprocessor-based or programmable consumer electronics, minicomputers, mainframe computers and the like. The embodiments can also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein are useful machine operations. The e also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for managing data use of an enterprise, comprising,
   (a) receiving login parameters from a user associated with user identification information, the login parameters being supplied through a user interface of a screen;
   (b) authenticating the login parameters;
   (c) authenticating the user information to determine if the login parameters match the user identification information;
   (d) providing access to specific data in a database that stores enterprise information, the specific data being managed by policy rules that determine if the specific data is shared by users of the enterprise and determine if the specific data is private to the user;
   (e) upon providing access, initiating video capture of a viewing space for the screen, the video capture being stored in a non-volatile medium, the viewing space being configured to include a location where the user associate with the user identification information is predefined to reside when accessing the specific data;
   (f) during the video capture, capturing image data presented on the screen, text embedded within the image data presented on the screen, and input received for the user interface of the screen, wherein the captured image data, text embedded within the image data, and the input received are stored in the non-volatile medium; and
   (g) binding the video capture, the captured image data presented on the screen, the text embedded within the image data, and the input received, the binding acting to define audit data that defines a link between the user and actions taken by the user regarding the specific data, wherein the audit data is associated with one or more user policy violations, each policy violation being searchable to enable review of the user and actions taken that produced each policy violation, wherein the method is executed by a processor.

2. The method for managing data use of an enterprise as recited in claim 1, wherein the audit data is associated with a data and time for one or more sessions of access to the specific data, the specific data being of the enterprise.

3. The method for managing data use of an enterprise as recited in claim 1, wherein the audit data includes recorded information from one or more sensors, or one or more additional cameras for a location proximate to the screen, or audio captured proximate to the screen, or screen captures made of the screen, or user facial images captured in the viewing space.

4. The method for managing data use of an enterprise as recited in claim 1, further comprising,
   automatically disabling the access upon detection of no user present, or of multiple people viewing the screen, or detecting a camera in the viewing space, or a combination thereof.

5. The method for managing data use of an enterprise as recited in claim 1, wherein the database that stores enterprise information is connected to an enterprise network, each screen and device associated with each screen enables processing of (a)-(g), and stores the audit data in a security database.

6. The method for managing data use of an enterprise as recited in claim 1, wherein the audit data is made accessible to the users for viewing, and enables user request to remove captured data, the requests to remove captured data being verified by a security entity of the enterprise.

7. The method for managing data use of an enterprise as recited in claim 1, wherein the audit data produces an audit trail for each user of the enterprise, and the audit trail includes one or more security alerts for particular users in the enterprise, the security alerts maintaining the binding of the user to the actions taken by the user.

8. The method for managing data use of an enterprise as recited in claim 1, wherein the user identification information is associated with image data, or picture data, or video data, or image recognition data, or biometric sensor data, or a temperature sensor, or a weight sensor, or combinations of one or more thereof.

9. The method for managing data use of an enterprise as recited in claim 1, wherein the screen is associated with an apparatus, the apparatus is one of a standalone monitor, a tablet computer, a smartphone, a desktop computer, a laptop computer, a display device, or a touch screen.

10. The method for managing data use of an enterprise as recited in claim 1, wherein the user identification information is of a human face.

11. The method for managing data use of an enterprise as recited in claim 1, wherein the access is disabled upon detection of two or more people in proximity of the screen.

12. The method for managing data use of an enterprise as recited in claim 1, wherein a security entity is alerted of policy violations or activity determined by rules to be violations for the access.

13. The method for managing data use of an enterprise as recited in claim 1, wherein capturing image data further includes:

performing optical character recognition (OCR) of the captured image data to determine the text embedded within the image data.

14. The method for managing data use of an enterprise as recited in claim 1, wherein the enterprise includes a plurality of user accounts for accessing the database for applications in one or more of work flow tracking and optimization, manufacturing, testing, quality assurance, payment systems, or DRM applications.

15. A method for managing data use of an enterprise, the method comprising:
(a) receiving login parameters from a user associated with user identification information, the login parameters being supplied through a user interface of a screen;
(b) authenticating the login parameters;
(c) authenticating the user information to determine if the login parameters match the user identification information;
(d) providing access to specific data in a database that stores enterprise information, the specific data being managed by policy rules that determine if the specific data is shared by users of the enterprise or is private to the user;
(e) upon providing access, initiating video capture of a viewing space for the screen, the video capture being stored in a non-volatile medium, the viewing space being configured to include a location where the user associate with the user identification information is predefined to reside when accessing the specific data;
(f) during the video capture, capturing image data presented on the screen, text embedded within the image data presented on the screen, and input received for the user interface of the screen, wherein capturing image data of the user is performed either continuously or at predetermined intervals of time during a session of access; and
(g) binding the video capture, the captured image data presented on the screen, the text embedded within the image data, and the input received, the binding acting to define audit data that defines a link between the user and actions taken by the user regarding the specific data, wherein the audit data is associated with one or more user policy violations, each policy violation being searchable to enable review of the user and actions taken that produced each policy violation, wherein the method is executed by a processor.

16. A method for managing data use of an enterprise, comprising,
(a) receiving login parameters from a user associated with user identification information, the login parameters being supplied through a user interface of a screen;
(b) authenticating the login parameters;
(c) authenticating the user information to determine if the login parameters match the user identification information;
(d) providing access to specific data in a database that stores enterprise information, the specific data being managed by policy rules that determine if the specific data is shared by users of the enterprise and determine if the specific data is private to the user;
(e) upon providing access, initiating video capture of a viewing space for the screen, the video capture being stored in a non-volatile medium, the viewing space being configured to include a location where the user associate with the user identification information is predefined to reside when accessing the specific data;
(f) during the video capture, capturing image data presented on the screen, text embedded within the image data presented on the screen, and input received for the user interface of the screen;
(g) binding the video capture, the captured image data presented on the screen, the text embedded within the image data, and the input received, the binding acting to define audit data that defines a link between the user and actions taken by the user regarding the specific data, wherein the audit data is associated with one or more user policy violations, each policy violation being searchable to enable review of the user and actions taken that produced each policy violation;
(h) receiving login parameters from additional users, each of the additional users having respective user identification information;
(i) processing (b)-(c) for the additional users of the enterprise; and
(j) storing the audit data for the user and the additional users in a security database.

\* \* \* \* \*